United States Patent
Munro et al.

(10) Patent No.: US 7,791,780 B2
(45) Date of Patent: *Sep. 7, 2010

(54) QUANTUM COHERENT SYSTEMS AND OPERATIONS

(75) Inventors: William J. Munro, Bristol (GB); Timothy P. Spiller, Portishead (GB); Kae Nemoto, Tokyo (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 678 days.

This patent is subject to a terminal disclaimer.

(21) Appl. No.: 11/658,427

(22) PCT Filed: Jun. 28, 2005

(86) PCT No.: PCT/US2005/022969

§ 371 (c)(1), (2), (4) Date: Jan. 26, 2007

(87) PCT Pub. No.: WO2006/023082

PCT Pub. Date: Mar. 2, 2006

(65) Prior Publication Data

US 2008/0310000 A1    Dec. 18, 2008

Related U.S. Application Data

(63) Continuation-in-part of application No. 10/899,332, filed on Jul. 26, 2004, now Pat. No. 7,133,173.

(30) Foreign Application Priority Data

Aug. 17, 2004    (GB) ................. 0418360.4

(51) Int. Cl.
*G06E 3/00*    (2006.01)
*G02F 3/00*    (2006.01)

(52) U.S. Cl. .................... 359/107; 359/108

(58) Field of Classification Search ........... 359/107, 359/108
See application file for complete search history.

(56) References Cited

U.S. PATENT DOCUMENTS 7,133,173  B2 *  11/2006  Beausoleil et al. .......... 359/108
2003/0086138  A1     5/2003  Pittman et al.

(Continued)

FOREIGN PATENT DOCUMENTS

JP    01-129237    5/1989

(Continued)

OTHER PUBLICATIONS

Barrett, S.D. et al., "Symmetry analyzer for nondestructive Bell-state detection using weak nonlinearities" Phys Rev A, vol. 71, No. 6 (2005).

(Continued)

*Primary Examiner*—Stephone B Allen
*Assistant Examiner*—Jade R Callaway

(57) ABSTRACT

Nonlinear elements can efficiently implement quantum information processing systems such as controlled phase shifters, non-absorbing detectors including parity detectors, quantum subspace projections, non-absorbing Bell state analyzers, non-absorbing encoders/entanglers, and fundamental quantum gates such as CNOT gates. The non-absorbing detectors permit improvements in the efficiency of a probabilistic quantum gate by permitting reuse of the same photonic resources during multiple passes through the probabilistic gate.

16 Claims, 8 Drawing Sheets

U.S. PATENT DOCUMENTS

2005/0117836 A1 6/2005 Franson et al.
2005/0133780 A1 6/2005 Azuma

FOREIGN PATENT DOCUMENTS

WO WO 01/75512 A 10/2001

OTHER PUBLICATIONS

Browne, Daniel et al., "Efficient Linear Optical Quantum Computation" arXiv: quant-ph/0405157 v 1, pp. 1-5 (2004).
Franson, J.D. et al., "High Fidelity Logic Operations Using Linear Optical Elements" Physical Rev. Ltrs., vol. 89, No. 13, pp. 137901/1-4 (2002).
Gasparoni, Sara et al., "Realization of a Photonic Controlled-NOT Gate Sufficient for Quantum Computation" Phys Rev. Ltrs. vol. 93, No. 2, pp. 020504/1-4 (2004).
Knill, E. et al., "A Scheme for Efficient Quantum Computation With Linear Optics" Nature, vol. 409, pp. 46-52 (2001).
Munro, "A high-efficiency quantum non-demolition single photon number resolving detector" arxiv.org/PS_cache/quant-ph/pdf/0310/0310066v1.pdf (2003).
Nemoto, Kae et al., "Nearly Deterministic Linear Optical Controlled-NOT Gate" Phys Rev Ltrs., PRL 93, pp. 250502/1-4 (2004).
Pittman, T.B. et al., "Probabilistic quantum logic operations using polarizing beam splitters" Phys Rev A, vol. 64, pp. 062311/1-9 (2001).
Pittman, T.B. et al., "Demonstration of Nondeterministic Quantum Logic Operations Using Linear Optical Elements" Phys Rev. Ltrs., vol. 88, No. 25, pp. 257902/1-4 (2002).
Pittman, T.B. et al., "Cyclical Quantum Memory for Photonic Qubits" Phys Rev. A 66, pp. 062302/1-4 (2002).
Pittman, T.B. et al., "Demonstration of feed-forward control for linear optics quantum computation" Phys. Rev A, vol. 66 pp. 052305/1-7 (2002).
Pittman, Todd B., "Quantum Computing using Linear Optics" quant-ph/0406192, pp. 1-22 (2004).
Ralph, T.C. et al. "Simple Scheme for efficient linear optics quantum gates" Phys Rev A, vol. 65, pp. 012314/1-6 (2001).
Schuch, N. et al., "Programmable Networks for quantum algorithms" Physical Rev. Ltrs. APS USA vol. 91, No. 2, pp. 027902/1-4 (2003).
Soljacic, Marin et al., "Ultra Low-power All-optical Switching" oai:arXiv.org:physics/0406001 (2004).
Zhang, Modularization of multi-qubit controlled phase gate and its NMR implementation arxiv.org/PS_cache/quant-ph/pdf/0406/0406209.pdf (2004).
Haus et al., "Optical quantum nondemolition measurements and the Copenhagen interpretation", Physical Review A, Jun. 1996, vol. 53, No. 6, p. 3785-3791.
Kartner et al., "Quantum-nondemolition measurements and the collapse of the wave function", Physical review A, Jun. 1993, vol. 47, No. 6, p. 4585-4592.
First Office Action; Chinese Patent Application No. 200580024862.7; PCT priority application filed Jun. 28, 2005.
Hewlett-Packard Development Company, L.P., Office Action issued by Chinese State Intellectual Property Office, Application No. 200580024862.7 Dated Feb. 12, 2010.

* cited by examiner

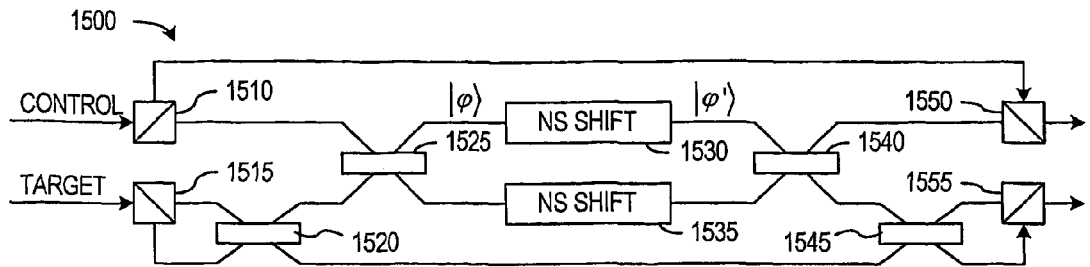
FIG. 15
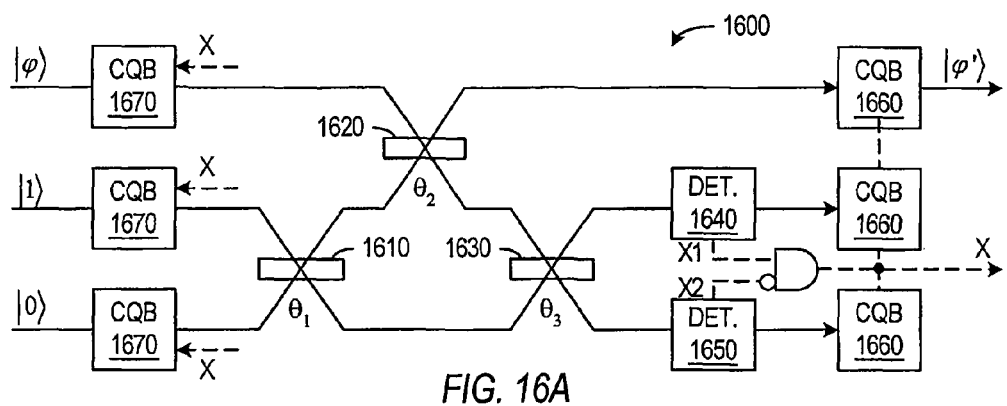
FIG. 16A
FIG. 16B
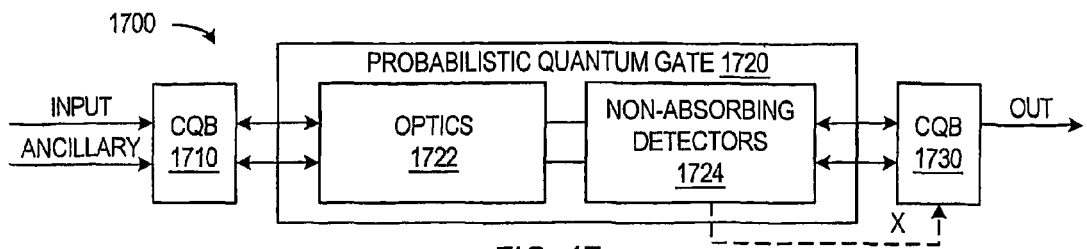
FIG. 17

QUANTUM COHERENT SYSTEMS AND OPERATIONS

CROSS-REFERENCE TO RELATED APPLICATIONS

This patent document is a continuation-in-part and claims benefit of the earlier filing date of U.S. patent application Ser. No. 10/899,332, filed Jul. 26, 2004, now U.S. Pat. No. 7,133,173.

BACKGROUND

Quantum information processing generally includes manipulation or use of quantum states to store or communicate information or to perform calculations. A variety of systems having quantum states have been proposed or used in quantum information processing. Optical systems, for example, can manipulate the quantum states of light to perform specific quantum information processing tasks.

A quantum computer architecture based on linear optical elements with nonlinearities induced by photodetection and feed-forward systems was originally proposed by E. Knill, R. Laflamme, and G. J. Milburn, "A Scheme for Efficient Quantum Computation with Linear Optics," Nature 409, 47 (2001). Although this proposal demonstrated that linear optics quantum computation (LOQC) was possible in principle, scalable systems based on this approach required an impractically large supply of quantum resources for reliable operation. Improvements to the proposal of Knill et al. have been developed (and experimentally demonstrated) requiring fewer resources, but these more recent proposals proscribe quantum circuit elements that behave probabilistically. For example, the quantum controlled-NOT gate described by T. B. Pittman, B. C. Jacobs, and J. D. Franson, "Probabilistic Quantum Logic Operations Using Polarizing Beam Splitters," Phys. Rev. A 64, 062311 (2001) requires fewer resources than corresponding systems proposed by Knill et al., but does not operate deterministically.

The system proposed by Pittman et al. uses measurement of one or more input photonic qubits and a first set of ancilla photonic qubits. The measurement results allow selection of one or more photonic qubits from a second set of ancilla photonic qubits that are entangled with the first set of ancilla photonic qubits. A problem with this technique is that the selected output photonic qubit has an inherent probability of being incorrect for the gate being implemented. The probability that the system will fail to produce the correct output is typically 75% (assuming perfect photodetectors). A linear quantum optical computer of this type having several such gates is thus extremely wasteful of offline quantum resources (e.g., entangled photons) and may be impractical for complex systems. For example, a quantum circuit including several linear optical quantum gates could perform a computation by operating those gates in parallel; the gates outputs can be teleported into the computation when the gates have functioned properly. Although this approach is scalable, it would require many repetitions of individual gate operations until the computation succeeded, thereby wasting many entangled and ancilla photons.

Optical quantum information processing systems are desired that are deterministic or otherwise efficiently utilize quantum resources. Ideally, such optical systems would also be suitable for miniaturization down to nanometer scales.

SUMMARY

In accordance with an aspect of the invention, nonlinear optical elements such as controlled phase shifters can be used to implement elements such as quantum subspace projectors, Bell state analyzers, quantum encoders, parity detectors, and destructive and nondestructive CNOT gates with near-deterministic performance.

BRIEF DESCRIPTION OF THE DRAWINGS

FIG. 15 shows an embodiment of an efficient CNOT gate capable of employing efficient nonlinear sign gates.

FIGS. 16A and 16B show alternative embodiments of multi-pass non-linear sign gates using non-absorbing state detection.

FIG. 17 illustrates a multi-pass probabilistic quantum gate in accordance with an embodiment of the invention.

Use of the same reference symbols in different figures indicates similar or identical items.

DETAILED DESCRIPTION

In accordance with an aspect of the invention, nonlinear optical elements can efficiently implement quantum information processing tasks such as controlled phase shifts, non-absorbing state detection, non-absorbing Bell state analysis, heralded state preparation, non-absorbing encoding, and fundamental quantum gate operations such as a controlled-not (CNOT) gate. Direct use of optical non-linearity can amplify small phase shifts and use feed forward systems in a near deterministic manner with high operating efficiency.

A preferred embodiment of the invention uses a nonlinear effect such as Electromagnetically Induced Transparency (EIT) to produce measurable phase shifts and can be implemented using waveguides and interaction sites (e.g., EIT atoms) that can be fabricated using nano-scale structures. For example, R. G. Beausoleil, W. J. Munro, and T. P. Spiller, "Applications of Coherent Population Transfer to Quantum Information Processing," quant-ph/0302109 (2003), also published in Journal of Modern Optics, Vol. 51, No. 11, pp 1559-1601 (2004), describes use of EIT interactions in quantum optical systems that can be fabricated using nanoscale structures. See also R. G. Beausoleil et al., "Applications of Electromagnetically Induced Transparency to Quantum Information Processing," Journal of Modern Optics, Vol. 51, pp. 2441-2448 (2004), and W. J. Munro et al. "A High-Efficiency Quantum Non-Demolition Single Photon Number Resolving Detector," Phys. Rev. A 71, 033819 (2005). However, embodiments of the invention can be implemented with larger scale structures that use EIT, a general cross-Kerr non-linearity, or other nonlinear photon interactions.

Figure 1:
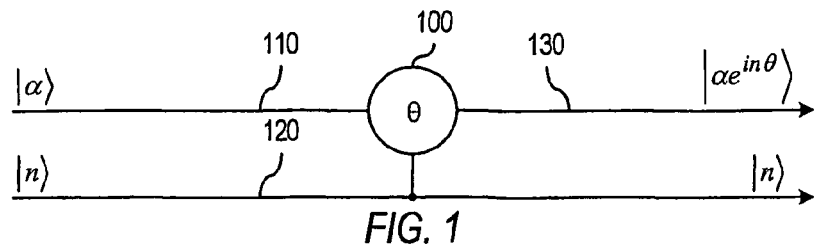
FIG. 1 shows a nonlinear optical element that implements a controlled phase shifter suitable for quantum nondestructive detection.

FIG. 1 schematically illustrates a controlled phase shifter 100 in accordance with an exemplary embodiment of the invention. Controlled phase shifter 100 has a probe mode 110, an input mode 120, and a measurement mode 130. In an exemplary operation of phase shifter 100 illustrated in FIG. 1, a coherent photonic state $|\alpha\rangle$ is applied in probe mode 110, and an n-photon Fock state $|n\rangle$ is applied to input mode 120. A non-linear interaction of coherent photonic state $|\alpha\rangle$ and Fock state $|n\rangle$ in controlled phase shifter 100 causes a phase shift $n\theta$, producing an output coherent photonic state $|\alpha e^{in\theta}\rangle$ on measurement mode 130. As further described by W. J. Munro, K. Nemoto, R. G. Beausoleil, and T. P. Spiller, "A High-Efficiency Quantum Non-Demolition Single Photon Number Resolving Detector," Phys. Rev. A 71, 033819 (2005), the characteristics or properties of controlled phase shifter 100 fix the phase constant $\theta$, so that a measurement of the phase shift $n\theta$ in the coherent probe state determines the number n of photons in Fock state $|n\rangle$ of input mode 120.

Figure 2A:
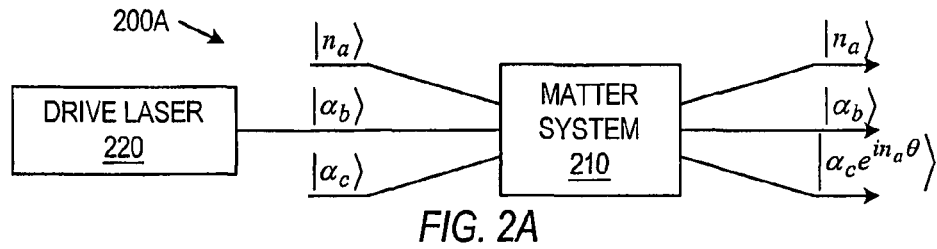
FIGS. 2A, 2B, and 2C show controlled phase shifters in accordance with alternative embodiments of the invention using electromagnetically induced transparency.
Figure 2B:
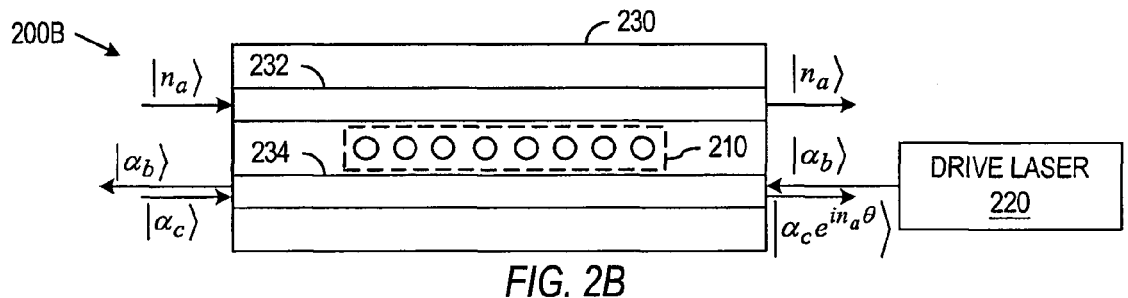
Figure 2C:
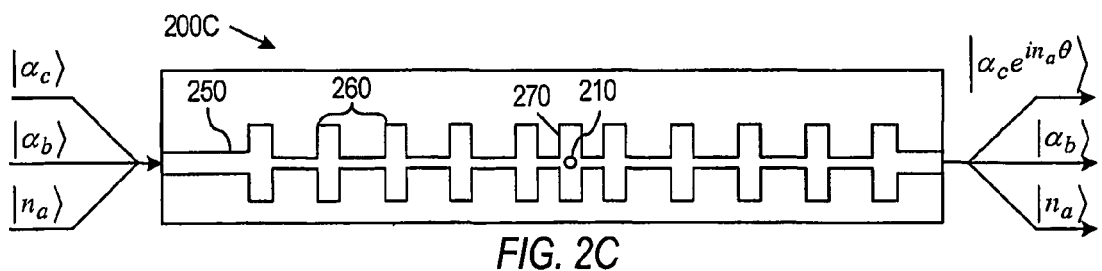

FIGS. 2A, 2B, and 2C illustrate specific implementations of controlled phase shifters 200A, 200B, and 200C using electromagnetically induce transparency (EIT) to induce phase shifts. These EIT systems generally apply photonic states to a matter system where nonlinear interactions with the matter system can induce a phase shift without destroying or otherwise altering the quantum state of the photons.

FIG. 2A illustrates a structurally simple phase shifter 200A including a matter system 210 in free space. Matter system 210 can be gas cell or any structure having one or more sites with suitable quantum energy levels for EIT. In phase shifter 200A, photonic states $|n_a\rangle$ and $|\alpha_c\rangle$, which respectively correspond to photonic states $|n\rangle$ and $|\alpha\rangle$ in FIG. 1, are directed to overlap at the location of matter system 210. The subscripts for states $|n_a\rangle$ and $|\alpha_c\rangle$ identify the frequencies of photons in the respective states. A drive laser 220 further directs a photonic state $|\alpha_b\rangle$ to overlap with photonic states $|n_a\rangle$ and $|\alpha_c\rangle$ in matter system 210. The overlap of the three photonic states $|n_a\rangle$, $|\alpha_b\rangle$, and $|\alpha_c\rangle$ having suitably selected frequencies permits an EIT interaction with a 4-level matter system to induce a phase shift as described further below.

FIG. 2B illustrates a controlled phase shifter 200B suitable for fabrication in a solid-state system. Controlled phase shifter 200B includes a photonic crystal 230 that contains waveguides 232 and 234. When compared to controlled phase shifter 100 of FIG. 1, waveguide 232 corresponds to input mode 120, and waveguide 234 corresponds to photon modes 110 and 130. A laser 220 also drives waveguide 234 with control photonic state $|\alpha_b\rangle$ required for a specific EIT interaction described further below. The direction of propagation photonic states $|\alpha_b\rangle$ and $|\alpha_c\rangle$ can be opposite to simplify separation of the modes for measurement or use. For the EIT interaction, a matter system 210 is preferably confined in photonic crystal 230 at a location such that the evanescent fields corresponding to photons in waveguides 232 and 234 interact with matter system 210, and the interaction creates a phase shift in photonic probe state in waveguide 234.

FIG. 2C illustrates phase shifter 200C including a waveguide 250 with a periodic series of cells 260. Waveguide 250 can be formed of a high index material (e.g., $\epsilon=12$) surrounded with air or other low index material (e.g., $\epsilon=1$). In an exemplary embodiment, waveguide 250 has a thickness 0.55 t where t is the period of cells 260. Each cell 260 can be a thick segment (e.g., of thickness 1.25 t and length 0.4 t), followed by a thin segment (e.g., of thickness 0.25 t and length 0.6 t). A cavity 270 can be implemented by introducing a defect into a periodic structure 260. For example, narrowing the length of the central thick element to 0.3 t, and narrowing the length of the two neighboring thin elements to 0.25 t can introduce cavity/defect 270. A matter system 210 can be located in cavity 270.

Photonic states $|n_a\rangle$, $|\alpha_b\rangle$, and $|\alpha_c\rangle$ are all input to waveguide 250 and traverse cavity 270, which contains matter system 210. The slow light effect induced using periodic cells 260 and cavity 270 increases the interaction time of photonic states $|n_a\rangle$, $|\alpha_b\rangle$, and $|\alpha_c\rangle$ with matter system 210 and may correspondingly increase the phase shift of phase shifter 200C. Output photonic states $|n_a\rangle$, $|\alpha_b\rangle$, and $|\alpha_c e^{in_a\theta}\rangle$ from waveguide 250 can be separated using beam separation methods such as known polarization and/or frequency based techniques. For example, photonic state $|n_a\rangle$ can have TE polarization in waveguide 250 while $|\alpha_b\rangle$ and $|\alpha_c\rangle$ have an orthogonal TM polarization. A polarizing beam splitter can then separate state $|n_a\rangle$ from states $|\alpha_b\rangle$ and $|\alpha_c e^{in_a\theta}\rangle$, and a frequency filter can remove state $|\alpha_b\rangle$ to leave separated state $|\alpha_c e^{in_a\theta}\rangle$.

Figure 3:
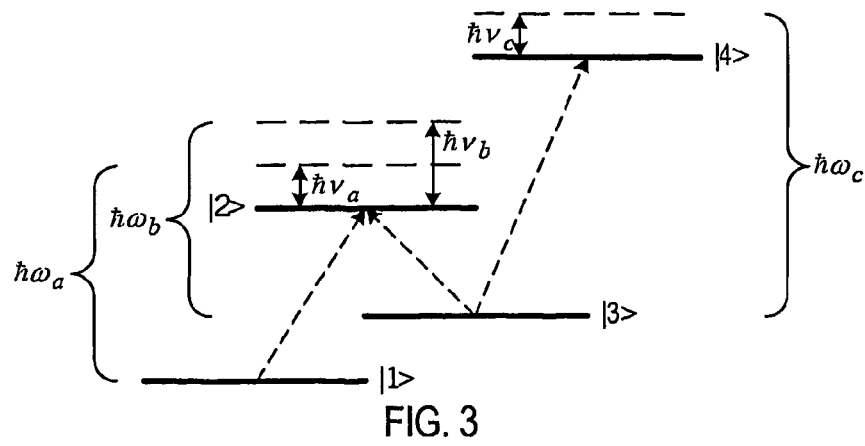
FIG. 3 is an energy level diagram for a matter system used in the controlled phase shifters of FIGS. 2A, 2B, and 2C.

In an exemplary embodiment, matter system 210 in controlled phase shifter 200A, 200B, or 200C includes at least one atom, molecule, or other structure having four states $|1\rangle$, $|2\rangle$, $|3\rangle$, and $|4\rangle$ with quantum energy levels as shown in FIG. 3. The photonic states $|n_a\rangle$, $|\alpha_b\rangle$, and $|\alpha_c\rangle$ correspond to modes having respective angular frequencies $\omega_a$, $\omega_b$, and $\omega_c$ that are selected according to the energy levels of matter system 210 but can otherwise be in any range of the electromagnetic spectrum including optical frequencies, radio/microwave frequencies, and other telecom frequencies. In general, angular frequencies $\omega_a$, $\omega_b$, and $\omega_c$ couple to corresponding transitions between the quantum energy levels of matter system 210. In particular, with the energy levels of FIG. 3, photons of angular frequency $\omega_a$ couple atomic energy state $|1\rangle$ to energy state $|2\rangle$. Photons of angular frequency $\omega_b$ and $\omega_c$ couple the metastable energy state $|3\rangle$ to energy states $|2\rangle$ and $|4\rangle$, respectively.

The relative order of the energy levels illustrated in FIG. 3 is merely an example, and more generally, a reordering of energy levels would still permit EIT. In particular, although FIG. 3 shows the fourth energy state |4⟩ as being higher in energy than the second energy state |2⟩, the second state |2⟩ as being higher in energy than the third energy state |3⟩, and the third energy state |3⟩ as being higher in energy than the first energy state |1⟩, EIT can be produced with a matter system that provides an arbitrary ordering of these energy levels.

Third energy state |3⟩ is preferably metastable in that no single-photon spontaneous emission is permitted. Such metastability may result, for example, if the spin/angular momentum of energy state |3⟩ and available lower energy states are such that a conservation law forbids emission of a single photon during a transition of the matter system from energy state |3⟩ to a lower energy state. Spontaneous transitions from the fourth energy state |4⟩ (e.g., to the first state |1⟩ or second state |2⟩) can be similarly suppressed either by selecting a matter system 210 such that the fourth energy state |4⟩ is metastable or by selecting the properties of photonic crystal 230 to inhibit or prohibit propagation of photons having angular frequencies corresponding to the transitions from the fourth energy state |4⟩.

Detuning parameters $\nu_a$, $\nu_b$, and $\nu_c$ in FIG. 3 indicated the respective amount of detuning of angular frequencies $\omega_a$, $\omega_b$, and $\omega_c$ from resonances of the energy level transitions of matter system 210 as indicated in Equations 1. In Equations 1, the energy differences between states |1⟩ and |2⟩, between |3⟩ and |2⟩, and between |3⟩ and |4⟩ are $\omega_{12}$, $\omega_{32}$, and $\omega_{34}$, respectively.

$$\omega_a = (\omega_{12} + \nu_a)$$

$$\omega_b = (\omega_{32} + \nu_b)$$

$$\omega_c = (\omega_{43} + \nu_c) \qquad \text{Equations 1}$$

EIT Makes Matter System 210 Transparent to Photons of Angular Frequency $\omega_a$ or $\omega_c$, while laser 220 is driving matter system 210 with photons having angular frequency $\omega_b$. When photons of angular frequencies $\omega_a$, $\omega_b$, and $\omega_c$ simultaneously interact with matter system 210, the state of photons having angular frequencies $\omega_a$ and $\omega_c$ picks up an overall phase shift that depends on the number $n_a$ of photons having angular frequency $\omega_a$ and the number $n_c$ of photons having angular frequency $\omega_c$. The size of the phase shift can also depend on the detuning parameters $\nu_a$, $\nu_b$, and $\nu_c$, the relative polarization of the photons, and properties of matter system 210.

The phase shift or evolution of the coherent probe states $|\alpha_c\rangle$ can be derived from the evolution of Fock states. In particular, Fock states components containing $n_a$, $n_b$, and $n_c$ photons respectively drive the three frequency channels of the resonant four-level manifold of matter system 210. If matter system 210 includes N four-level atoms that are fixed and stationary in a volume that is small compared to the optical wavelengths, and if the durations of the three pulse envelope functions of the Fock states are long compared to the lifetime of atomic level 2, the unperturbed photon number eigenstate $|1, n_a, n_b, n_c\rangle$ evolves as indicated in Equation 2, where 1 identifies the state of the matter system and $n_a$, $n_b$, $n_c$ are the numbers of photons in the respective modes.

$$|1, n_a, n_b, n_c\rangle \rightarrow e^{-iWt}|1, n_a, n_b, n_c\rangle \qquad \text{Equation 2}$$

The quantity W in Equation 2 generally depends on the properties of the matter system 210 and the angular frequencies $\omega_a$, $\omega_b$, and $\omega_c$. Equations 3A and 3B give the quantity W in the case where angular frequencies $\omega_a$ and $\omega_b$ are precisely tuned to the respective atomic transition angular frequencies $\omega_{12}$ and $\omega_{32}$, dephasing is negligible, and the spontaneous emission branching ratios from atomic levels 2 and 4 are approximately unity. In Equation 3A, N is the number of four-level atoms, $\Omega_a$, $\Omega_b$, and $\Omega_c$ are the effective vacuum Rabi frequencies as given in Equation 3B, $\nu_c$ is the detuning parameter ($\omega_c - \omega_{43}$), and $\gamma_2$ and $\gamma_4$ are approximately equal to the spontaneous emission rates $A_{21}$ and $A_{43}$. In Equation 3B, k is an index having values a, b, and c; $\sigma_k$ by definition is the resonant atomic absorption cross-section $3\lambda_k^2/2\pi$ at wavelength $\lambda_k$ $2\pi c/\omega_k$; $\pi w^2$ is the effective laser mode cross-sectional area, $A_k$ is the spontaneous emission rate between two corresponding atomic levels; and $\omega_k$ is the bandwidth of the profile function describing the adiabatic interaction of a pulsed laser field with a stationary atom.

$$W = \frac{N|\Omega_a|^2|\Omega_c|^2 n_a n_c}{\nu_c|\Omega_b|^2 n_b + i(\gamma_4|\Omega_b|^2 n_b + \gamma_2|\Omega_c|^2 n_c)} \qquad \text{Equation 3A}$$

$$|\Omega_k|^2 = \frac{1}{8\pi} \frac{\sigma_k}{\pi w^2} A_k \Delta\omega_k \qquad \text{Equation 3B}$$

Equation 3A indicates that W for four-level EIT systems is complex, indicating potential absorption of the photons of frequency $\omega_a$. However, in the parameter regime where the inequality of Equation 4 is satisfied, the probability that one of the atoms will scatter a single photon of angular frequency $\omega_a$ becomes small. (Equation 4 simplifies to the requirement that $\nu_c/\gamma_4$ be large when $|\Omega_b|^2|\alpha_b|^2/\gamma_2$ is about equal to $|\Omega_c|^2|\alpha_c|^2/\gamma_4$). Working in this regime, the state $|1, n_a, n_b, n_c\rangle$ acquires purely a phase-shift from the nonlinear mechanism. This phase shift can be the basis of high-efficiency nonlinear optical elements for quantum information processing.

$$\frac{|\Omega_b|^2|\alpha_b|^2}{\gamma_2} \frac{\nu_c}{\gamma_4} \gg \frac{|\Omega_b|^2|\alpha_b|^2}{\gamma_2} + \frac{|\Omega_c|^2|\alpha_c|^2}{\gamma_4} \qquad \text{Equation 4}$$

The evolution of the atom-field state including coherent state $|\alpha_b\rangle$ and coherent probe state $|\alpha_c\rangle$ can be evaluated using sums over Fock states representing each coherent state. In particular, Equation 5 shows the evolution after a time t of an N-atom quantum state during an interaction with an $n_a$-photon Fock state in the a channel, and weak coherent states parameterized by $\alpha_b$ and $\alpha_c$ in the b and c channels, respectively. Equation 6 defines the phase shift $\theta$. Equations 5 and 6 show that an evolved state $|\psi'(n_a)\rangle$ is not a simple tensor product of a Fock state with two coherent states unless the magnitude of parameter $\alpha_b$ of the original b channel coherent state is large, in which case, evolved state $|\psi'(n_a)\rangle$ is about equal to $$|1, n_a, \alpha_b, \alpha_c e^{-in_a\theta}\rangle.$$

Therefore, only when the coupling field driving channel b is a classical field does the EIT matter system provide an exact cross-Kerr nonlinearity; and for a weak coherent state input pulse, treating this control field as a classical field is not allowed. Equations 5 and 6 also show that in the cavity-enhanced embodiment of FIG. 2C, the evolution may be able to achieve larger phase shifts $\theta$ because the Rabi frequencies can be much larger than the decoherence rates.

$$|\psi(n_a)\rangle \equiv |1, n_a, \alpha_b, \alpha_c\rangle = \quad \text{Equation 5}$$

$$e^{-\frac{1}{2}(|\alpha_b|^2+|\alpha_c|^2)} \sum_{n_b=0}^{\infty} \sum_{n_c=0}^{\infty} \frac{\alpha_b^{n_b} \alpha_c^{n_c}}{\sqrt{n_b! n_c!}} |1, n_a, n_b, n_c\rangle$$

$$\to |\psi'(n_a)\rangle = e^{-\frac{1}{2}|\alpha_b|^2} \sum_{n_b=0}^{\infty} \frac{\alpha_b^{n_b}}{\sqrt{n_b!}} |1, n_a, n_b, \alpha_c e^{-in_a \theta |\alpha_b|^2/n_b}\rangle$$

$$\theta \equiv \chi^I \equiv \frac{N|\Omega_a|^2|\Omega_c|^2}{\nu_c|\Omega_b|^2|\alpha_b|^2} t \quad \text{Equation 6}$$

Accordingly, if state $|\alpha_c\rangle$ is known, and if unmeasured properties such as the polarization of photons in state $|n_a\rangle$ are fixed, the controlled phase shifter 200A, 200B, or 200C can provide a phase shift that is approximately proportional to the number $n_a$ of photons in input state $|n_a\rangle$. These results are not unique to selection of photons of angular frequency $\omega_c$ or a coherent state for the probe state or angular frequency $\omega_a$ for the input state in the EIT system described above. Further, other systems that introduce a cross-Kerr nonlinearity can similarly introduce phase shifts in a probe state. Accordingly, the following descriptions drops the subscripts from the probe state $|\alpha\rangle$ and input state $|n\rangle$, with the understanding that in a specific embodiment using EIT, the angular frequencies of the photons can be selected as described above.

In general, the phase shift in probe state $|\alpha\rangle$ depends on the polarizations of states $|\alpha\rangle$ and $|n\rangle$ because the interaction of probe state $|\alpha\rangle$ with control state $|n\rangle$, and therefore the phase constant $\theta$, generally depends on photon polarizations. A measurement of the phase shift in phase shifter 100, 200A, 200B, or 200C can identify a photon polarization and thus project/change the polarization state of the photons in the input mode. However, the phase shifting capabilities of the controlled phase shifter described above can be used in a system that preserves the polarization of the input state photons while measuring the number of input state photons.

Figure 4A:
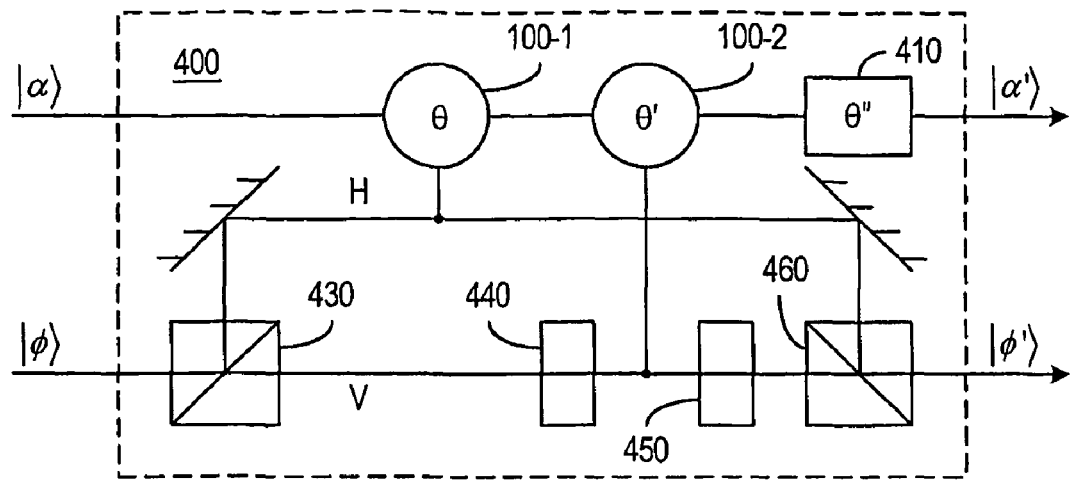
FIGS. 4A and 4B show photon number resolving phase shifters in accordance with an embodiment of the invention capable of preserving the polarization or other properties of an input state.

FIG. 4A illustrates a general phase shifter 400 that shifts the phase of a probe state $|\alpha\rangle$ by a phase shift that depends on the number, polarizations, or other properties of photons in an input state $|\phi\rangle$. In an exemplary application of phase shifter 400, input state $|\phi\rangle$ is an eigenstate of polarization having a definite number p of horizontally polarized photons and a definite number q of vertically polarized photons (i.e., in the exemplary case, $|\phi\rangle = |H^p V^q\rangle$). This exemplary application of phase shifter 400 is particularly useful in quantum systems that use polarization encoding to represent qubits.

System 400 includes a fixed phase shifter 410 and two controlled phase shifters 100-1 and 100-2. Phase shifter 410 causes a fixed shift $\theta''$ in the phase of probe state $|\alpha\rangle$ and can be implemented using a linear retarder (or omitted for the case where fixed shift $\theta''$ is equal to zero.) Both controlled phase shifters 100-1 and 100-2 also act on probe state $|\alpha\rangle$ but under the control of different components of state $|\phi\rangle$. Controlled phase shifters 100-1 and 100-2 can be implemented using EIT non-linearity as described above or using any other system that provides an approximate Kerr non-linearity. Some examples of controlled phase shifters 100-1 and 100-2, may use whispering-gallery micro-resonators, optical fibers, doped optical fibers or photonic crystal fibers, or cavity QED systems. Phase shifters 100-1 and 100-2 have respective phase constants $\theta$ and $\theta'$, which in general may differ from each other.

As illustrated in FIG. 4A, a polarizing beam splitter 430 splits input state $|\phi\rangle$ into components distinguished by polarization. A first component (e.g., a component state corresponding to horizontally polarized photons) controls controlled phase shifter 100-1. In the case where the horizontally polarized component of state $|H^p V^q\rangle$ controls phase shifter 100-1, controlled phase shifter 100-1 introduces a phase shift $p\theta$ to probe state $|\alpha\rangle$. Optionally, a polarization-changing element 440 can change the polarization of the second polarization component of state $|\phi\rangle$ to the same polarization as the first polarization component. For example, polarization changing element 440 can be a half-wave plate oriented to change the polarization of photons in the second component from vertically polarized to horizontally polarized. The polarization of the transformed state output from element 440 controls phase shifter 100-2. A second polarization changing element 450 undoes or reverses the polarization change that element 440 caused in the second polarization component, so that a beam combiner 460 can recombine the first and second polarization components and construct output state $|\phi'\rangle$. Such polarization changes can simplify implementation of phase shifters 100-1 and 100-2 that have the same phase constant, i.e., for a specific case where constants $\theta$ and $\theta'$ are equal. However, polarization-changing element 440 and 450 may be unnecessary in an embodiment of the invention in which constants $\theta$ and $\theta'$ are not the same.

In the case where the vertically polarized component of state $|H^p V^q\rangle$ controls phase shifter 100-2, controlled phase shifter 100-2 introduces a phase shift $q\theta'$. The total phase shift in probe state $|\alpha\rangle$ in phase shifter 400 is the sum of the phase shifts from phase shifters 100-1, 100-2, and 410, i.e., $p\theta + q\theta' + \theta''$.

Phase shifter 400 will be a polarization-preserving phase shifter if phase shifters 100-1 and 100-2 are identical. In particular, the shift arising in phase shifter 100-1 is proportional to the number of photons in the first polarization component of state $|\phi\rangle$, and the shift arising in phase shifter 100-2 is proportional to the number of photons in the second polarization component of state $|\phi\rangle$. However, when element 440 causes the control photons for both controlled phase shifters 100-1 and 100-2 to have the same polarization, the polarization constants $\theta$ of phase shifters 100-1 and 100-2 are the same if phase shifters 100-1 and 100-2 are the same. With use of identical phase shifter 100-1 and 100-2 and no fixed shifter 410, the total phase shift in probe state $|\alpha'\rangle$ is proportional to the number $p+q$ of photons in state $|\phi'\rangle$, and even with a non-zero fixed phase shift, the output state from phase shifter 400 can be expressed as a product of state $|\phi'\rangle$ and a phase shifted state $|\alpha'\rangle$. A measurement of the total phase shift determines a total number $p+q$ of photons in state $|\phi'\rangle$, but the measurement does not determine the separate values of p and q or the polarization and does not change the polarization state. Accordingly, when phase shifters 100-1 and 100-2 are identical, phase shifter 400 preserves the polarization state of input state $|\phi\rangle$ even when the number $p+q$ of photons is measured.

One polarization-preserving embodiment of phase shifter 400 has phase constants $\theta$ and $\theta'$ that are the same but are the negative of fixed phase shift $\theta''$. In this embodiment, a phase shift $\theta$ in probe state $|\alpha\rangle$ results when state $|\phi'\rangle$ contains two photons. No phase shift in probe state $|\alpha\rangle$ results when input state $|\phi'\rangle$ contains one photon, and a phase shift $-\theta$ in probe state $|\alpha\rangle$ results when input state $|\phi'\rangle$ is the vacuum state. A measurement of probe state $|\alpha'\rangle$ can thus determine whether output state $|\phi'\rangle$ contains 0, 1, or 2 photons from the sign of the measured phase shift and whether the measured phase shift is non-zero. If input state $|\phi\rangle$ is a superposition of Fock states, the phase shift measurement projects input state $|\phi\rangle$ onto the subspace of Fock states having a number p+q of photons corresponding to the measurement outcome but does not reveal or change the polarization.

Figure 4B:
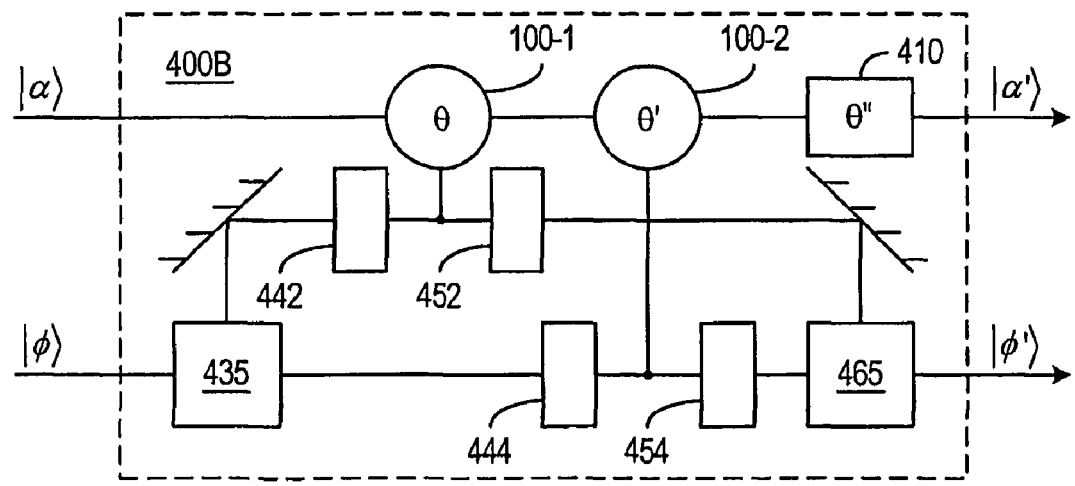

FIG. 4B shows a photon number resolving phase shifter 400B that can similarly preserve input state properties including but not limited to the polarization. For example, an input state $|\phi\rangle$ to phase shifter 400B may be a linear combination of photonic states having definite angular momentum or having in distinct time bins. In phase shifter 400B, a state separator 435 separates states associated with different quantum numbers of the preserved property. For example, separator 435 may be a hologram capable of separating photonic states having different angular momentum or an optical switch operated to direct photons in one time bin to control phase shifter 100-1 and photons in another time bin to control phase shifter 100-2. An optical system 442 in the control mode of phase shifter 100-1 and an optical system 444 in the control mode of phase shifter 100-2 can be used to transform the separated photonic control states to a form desired for control of respective phase shifters 100-1 and 100-2. Optical systems 452 and 452 undo the transformation of the separated control states, so that a combiner 465 can recombines the separated states after operation of controlled phase shifters 100-1 and 100-2 on probe state $|\alpha\rangle$ to produce output state $|\phi'\rangle$. In the same manner as described above, if phase constants $\theta$ and $\theta'$ of controlled phase shifters 100-1 and 100-2 are the same, the total phase shift of probe state $|\alpha\rangle$ will indicate the total number of photons in output state $|\phi'\rangle$, without determining any information concerning the numbers of photons in the individual separated states. A measurement of the phase shift can thus determine the total number of photons without changing the preserved property.

Configurations of phase shifters 400 or 400B also can be employed in systems projecting input state $|\phi\rangle$ into an identified or heralded subspace of photonic states. For example, one configuration for phase shifter 400 has fixed phase shift $\theta''$ equal to $-\theta$ and has phase constant $\theta'$ is equal to zero. This configuration of phase shifter 400 does not necessarily preserve polarization but provides an example of the use of phase shifts to project the input state onto a subspace having an identified number of horizontally polarized photons and an undetermined number of vertically polarized photons. For example, a phase shift $\theta$ in probe state $|\alpha\rangle$ identifies the subspace spanned by states containing two horizontally polarized photons. No phase shift in probe state $|\alpha\rangle$ identifies a subspace of states containing one horizontally polarized photon, and a phase shift $-\theta$ in probe state $|\alpha\rangle$ identifies the subspace spanned by the vacuum state and states including only vertically polarized photons. A measurement of the phase shift in probe state $|\alpha\rangle$ will thus project state $|\phi\rangle$ onto the subspace having a number of horizontally polarized photons determined from the sign and magnitude of the phase shift.

Figure 5:
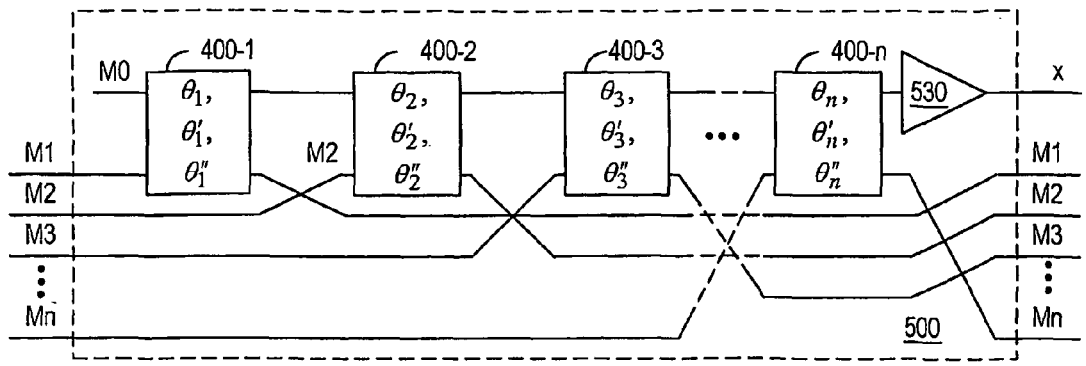
FIG. 5 shows an n-mode quantum subspace projector in accordance with an embodiment of the invention.

More generally combining phase shifters such as illustrated in FIG. 4A or 4B with a suitable measurement of a probe state can project a general input state onto other desired Hilbert subspace. FIG. 5, for example, illustrates an n-mode quantum subspace projector 500 in accordance with an embodiment of the invention using n phase shifters 400-1 to 400-n and a measurement system 530. As illustrated, projector 500 has a mode M0 for input of a probe state, e.g., a coherent state $|\alpha\rangle$, and n modes M1 to Mn for input of a general n-mode photonic state $|\Psi\rangle$. Each phase shifter 400-$i$ corresponds to a photon mode Mi and in generally has three phase constant $\theta_i$, $\theta'_i$, and $\theta''_i$. In FIG. 5, phase constant $\theta_i$ applies to phase shifts associated with horizontally polarized photons in mode i. Phase constant $\theta'_i$ applies to phase shifts associated with vertically polarized photons in mode i, and phase constant $\theta''_i$ corresponds to a fixed phase shift that the phase shifter 400-$i$ applies to probe state $|\alpha\rangle$.

Measurement system 530 extracts information about the total phase shift that the probe mode M0 acquires in phase shifters 400-1 to 400-n. As a result of the measurement, projector 500 projects the state of modes M1 to Mn into a Hilbert subspace that is spanned by states that are consistent with the measurement. The Hilbert subspace that is the target of the projection will in general depend upon the phase constants $\theta_1$ to $\theta_n$, $\theta'_1$ to $\theta'_n$, and $\theta''_n$ to $\theta''_n$ and on the specific measurement result obtained by measurement system 530. Additional optical components may be added to this system to adjust relative phases or provide other corrections based on the outcome of the measurement.

Figure 6A:
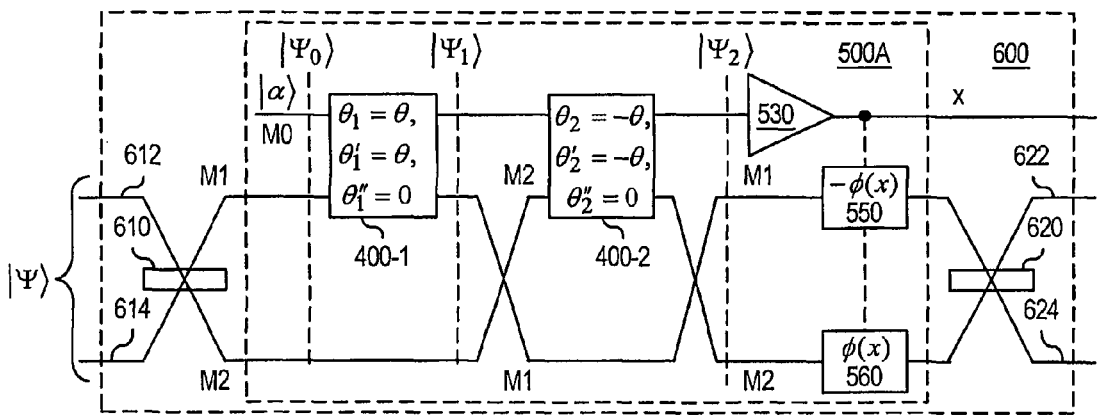
FIGS. 6A and 6B show non-absorbing symmetry analyzers in accordance with alternative embodiments of the invention using different 2-mode quantum subspace projectors.

One useful 2-mode quantum subspace projector projects a general 2-mode state onto either the Hilbert subspace spanned by "symmetric" Bell states or onto an antisymmetric Bell state. FIG. 6A illustrates a non-absorbing symmetry analyzer 600 in accordance with an embodiment of the invention that measures a phase shift in a probe state $|\alpha\rangle$ to obtain information regarding the symmetry of a 2-qubit input state $|\Psi\rangle$. The two-qubit state $|\Psi\rangle$ is generally a superposition of terms each of which is a product of a photonic state of mode 612 and a photonic state of mode 614. These input modes meet on a beam splitter 610 having output modes M1 and M2 that enter a 2-mode quantum subspace projector 500A. A second beam splitter 620 has modes M1 and M2 from projector 500A as input modes and operates to return photonic states associated with input modes 612 and 614 respectively to output modes 622 and 624.

The 2-mode quantum subspace projector 500A is a specific example of projector 500 of FIG. 5 when the number of modes is two. In particular, projector 500A includes polarization preserving phase shifters 400-1 and 400-2 that act on a probe state in a mode M0 and are respectively controlled by photonic states on modes M1 and M2. Each phase shifter 400-1 and 400-2 can be substantially the same as and constructed in the same manner as phase shifter 400 of FIG. 4. The specific choice of phase constants for phase shifter 400-1 in projector 500A are $\theta_1=\theta$, $\theta'_1=\theta$, and $\theta''_1=\theta$, and the phase constants for phase shifter 400-2, are $\theta_2=-\theta$, $\theta'_2=-\theta$, and $\theta''_2=\theta$, making both phase shifters 400-1 and 400-2 polarization-preserving phase shifters.

Two-qubit input state $|\Psi\rangle$ can be expressed without loss of generality as a linear combination of Bell states as indicated in Equation 7, where states $|B_1\rangle$, $|B_2\rangle$, $|B_3\rangle$, and $|B_4\rangle$ are normalized Bell states and coefficients $a_1$, $a_2$, $a_3$, and $a_4$ are complex probability amplitudes for respective Bell states $|B_1\rangle$, $|B_2\rangle$, $|B_3\rangle$, and $|B_4\rangle$. Linearity of quantum mechanics ensures that all results are valid also for superpositions and mixed states.

$$|\Psi\rangle = a_1|B_1\rangle + a_2|B_2\rangle + a_3|B_3\rangle + a_4|B_4\rangle \qquad \text{Equation 7}$$

Bell states $|B_1\rangle$, $|B_2\rangle$, $|B_3\rangle$, and $|B_4\rangle$ have the form given in Equations 8 in a representation where the binary values 0 and 1 of each qubit respectively correspond to horizontal (H) and vertical (V) polarization of photons. Herein, a state $|H^p V^q, H^r V^s\rangle$ indicates a state having p horizontally polarized and q vertically polarized photons in a first mode (e.g., mode 612) and r horizontally polarized and s vertically polarized photons in a second mode (e.g., mode 614). An important characteristic of the Bell states is that an operation that swaps photon modes (e.g., interchanges photon modes 612 and 614) takes Bell state $|B_1\rangle$ to its negative $|B_1\rangle$ but takes each of the other Bell states $|B_2\rangle$, $|B_3\rangle$, and $|B_4\rangle$ respectively back to themselves. Bell state $|B_1\rangle$ is thus antisymmetric under this transformation and is sometimes referred to herein as the singlet state. In contrast, the other three Bell states $|B_2\rangle$, $|B_3\rangle$, and $|B_4\rangle$ are unchanged by the swap transformation and are sometimes referred to herein as symmetric states.

$$|B_1\rangle \equiv \frac{1}{\sqrt{2}}(|H,V\rangle - |V,H\rangle)$$

$$|B_2\rangle \equiv \frac{1}{\sqrt{2}}(|H,V\rangle + |V,H\rangle)$$

$$|B_3\rangle \equiv \frac{1}{\sqrt{2}}(|H,H\rangle - |V,V\rangle)$$

$$|B_4\rangle \equiv \frac{1}{\sqrt{2}}(|H,H\rangle + |V,V\rangle)$$

Equations 8

In non-absorbing symmetry analyzer 600, beam splitter 610 interferes photons from modes 612 and 614 and (for a particular choice of phase convention for beam splitter 610) transforms Bell states as indicated in Equations 9. As can be seen from Equations 9, beam splitter 610 transforms the singlet state $|B_1\rangle$ back to the negative of itself and transforms the symmetric Bell states $|B_2\rangle$, $|B_3\rangle$, and $|B_4\rangle$ into linear combinations of states having two photons in one mode M1 or M2 and no photons in the other mode M2 or M1. This property allows analysis of state $|\Psi\rangle$ and particularly projection of state $|\Psi\rangle$ either into the antisymmetric Hilbert subspace (i.e., onto singlet state $|B_1\rangle$) or onto the symmetric Hilbert space spanned by Bell states $|B_2\rangle$, $|B_3\rangle$, and $|B_4\rangle$.

$$|B_1\rangle \rightarrow -|B_1\rangle$$

$$|B_2\rangle \rightarrow \frac{1}{\sqrt{2}}(|HV,0\rangle - |0,HV\rangle)$$

$$|B_3\rangle \rightarrow \frac{1}{2}(|H^2,0\rangle - |0,H^2\rangle - |V^2,0\rangle + |0,V^2\rangle)$$

$$|B_4\rangle \rightarrow \frac{1}{2}(|H^2,0\rangle - |0,H^2\rangle + |V^2,0\rangle - |0,V^2\rangle)$$

Equations 9

As noted above, the photonic states on output modes M1 and M2 of polarizing beam splitter 610 respectively control polarization preserving phase shifters 400-1 and 400-2. More specifically, the photonic state output from beam splitter 610 on mode M1 controls polarization preserving phase shifter 400-1, so that phase shifter 400-1 introduces a phase shift $n_1\theta$ to probe state $|\alpha\rangle$. The phase shift thus depends on the number $n_1$ of photons in mode M1 and the phase constant $\theta$ of polarization preserving phase shifter 400-1.

Polarization preserving phase shifter 400-2 has a phase constant $-\theta$ that is the negative of the phase constant $\theta$ of phase shifter 400-1. Generally, 4-level EIT phase shifters can produce phase shifts. Two phase shifters can produce phase shifts with opposite sign if the detuning constant $v_c$ of the angular frequency $\omega_c$ for one of the matter systems in one phase shifter is the negative of the corresponding detuning constant $v_c$ for the matter systems in the other phase shifter. The output mode M2 from beam splitter 610 controls polarization preserving-phase shifter 400-2, so that phase shifter 400-2 introduces a second phase shift $-n_2\theta$ of probe state $|\alpha\rangle$, where $n_2$ is the number of photons in mode M2.

If state $|\Psi\rangle$ is the singlet state $|B_1\rangle$, modes M1 and M2 from beam splitter 400-1 will each contain a single photon.

Phase shifter 620 will thus introduce a phase shift $\theta$, e.g., $|\alpha'\rangle = |\alpha e^{i\theta}\rangle$, and phase shifter 400-2 introduces an opposite phase shift $-\theta$. As a result, there is no net phase shift, i.e., $|\alpha'\rangle = |\alpha\rangle$, if state $|\Psi\rangle$ is the singlet state $|B_1\rangle$.

If state $|\Psi\rangle$ is in the symmetric part of the Hilbert space, i.e., is a linear combination of the symmetric Bell states $|B_2\rangle$, $|B_3\rangle$, and $|B_4\rangle$, the output modes M1 and M2 from beam splitter 610 are in a superposition of 2-photon states in mode M1 with a vacuum state in mode M2 and 2-photon states in mode M2 with a vacuum state in mode M1. The state having two photons in mode M1 causes a phase shift of $2\theta$ in probe state $|\alpha\rangle$, and the state having two photons in mode M2 causes a phase shift of $2\theta$ in probe state $|\alpha\rangle$. A detector 630 that can measure the magnitude of the phase shift can thus distinguish the singlet state $|B_1\rangle$ from a state that is in the symmetric Hilbert space spanned by Bell states $|B_2\rangle$, $|B_3\rangle$, and $|B_4\rangle$. For the desired projection, it is critical that the measurement not determine the sign of the phase shift.

In the case where analyzed state $|\Psi\rangle$ is a general linear combination of Bell states as in Equation 7, the operation of phase shifters 400-1 and 400-2 creates a state $|\Psi_2\rangle$ in which the mode M0 probe state is entangled with the mode M1 and M2 states. For example, if beam splitter 610 produces a state $|\Psi_0\rangle$ of the form of Equation 10, the action of phase shifter 400-1 produces the state $|\Psi_1\rangle$ shown in Equation 11. Phase shifter 400-2 then produces a state $|\Psi_2\rangle$ having the form indicated in Equation 12. (In Equations 10, 11, and 12, the polarizations of the photons are ignored because the phase shifts associated with polarization preserving phase shifters 400-1 and 400-2 are independent of the polarizations.)

$$|\Psi_0\rangle = |\alpha\rangle \, [a(|2,0\rangle - |0,2\rangle) + b|1,1\rangle\,]$$

Equation 10

$$|\Psi_1\rangle = a|\alpha e^{i2\theta}\rangle \, |2,0\rangle - a|\alpha\rangle \, |0,2\rangle + b|\alpha e^{i\theta}\rangle \, |1,1\rangle$$

Equation 11

$$|\Psi_2\rangle = a|\alpha e^{i2\theta}\rangle \, |2,0\rangle - a|\alpha e^{-2\theta}\rangle \, |0,2\rangle + b|\alpha\rangle \, |1,1\rangle$$

Equation 12

Figure 7A:
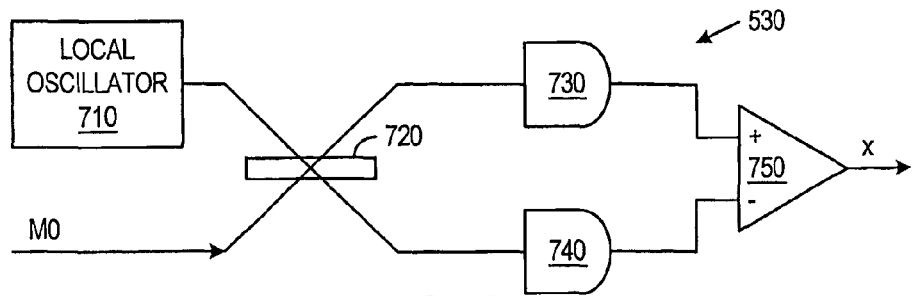
FIG. 7A shows a homodyne detector suitable for use in the subspace projector of FIG. 5 or the symmetry analyzer of FIG. 6A or 6B.

In an exemplary embodiment of the invention, measurement system 530 is a homodyne detector such as illustrated in FIG. 7A. Homodyne detector 530 includes a local oscillator 710, a beam splitter 720, photodiodes or detectors 730 and 740, and a differential amplifier 750. Local oscillator 710 preferably produces a reference coherent state of the same wavelength as probe state $|\alpha\rangle$. Beam splitter 720 interferes the state from mode M0 with the reference state with different relative signs in the two output modes from beam splitter 720. Photodiodes 730 and 740 generate currents proportional to the respective intensities of the interfering photonic states in the respective output modes from beam splitter 720, and differential amplifier 750 generates a measurement signal x indicating a difference between the photodiode currents.

It is known that a homodyne detector such as detector 530 of FIG. 7A effectively measures a value of a quadrature operator $\hat{X}(\phi)$ of the form given in Equation 13. In Equation 13, operators $a^\dagger$ and $a$ are respectively the creation and annihilation operators for probe mode M0, and $\phi$ is the phase difference between probe state $|\alpha\rangle$ and the reference state from local oscillator 710. A single measurement by the homodyne detector will yield an eigenvalue of operator $\hat{X}(\phi)$. For the special case where phase difference $\phi$ is zero, a measurement by detector 530 is commonly referred to as a measurement of the X-quadrature.

$$\hat{X}(\phi) = a^\dagger e^{i\phi} + a e^{i\phi}$$

$$\hat{X}(0) \equiv \hat{X} = a^\dagger + a$$

Equations 13

A homodyne measurement in symmetry analyzer 600 of FIG. 6A projects the photonic state in mode M0 onto an eigenstate of operator $\hat{X}(\phi)$. Shown in Equation 14 is an unnormalized state $|\Psi_3\rangle$ resulting from projection onto an eigenstate $|x\rangle$ in the specific case where phase difference $\phi$ is zero and state $|\Psi_2\rangle$ has the form indicated in Equation 12. Equation 15 indicates the results of evaluation of the inner products in Equation 14. From Equation 15, a measurement outcome x that is approximately equal to $2\alpha$, i.e., x $2\alpha$, projects state of the M1 and M2 mode photons to a state that is approximately equal to state $|1,1\rangle$, and therefore corresponds to the singlet state $|B_1\rangle$. A measurement outcome x that is approximately equal to $2\alpha \cos(2\theta)$, i.e., x $2\alpha \cos(2\theta)$, projects the mode M1 and M2 photons to $e^{i\phi(x)}|2,0\rangle - e^{-i\phi(x)}|0,2\rangle$, which corresponds to a state in the symmetric Hilbert state of Bell states $|B_2\rangle$, $|B_3\rangle$, and $|B_4\rangle$.

$$|\Psi_3\rangle = |x\rangle \langle x|\Psi_2\rangle = |x\rangle(\langle x|\alpha e^{i2\theta}\rangle$$
$$\alpha|2,0\rangle - \langle x|\alpha e^{-i2\theta}\rangle \alpha|0,2\rangle + \langle x|\alpha\rangle b|1,1\rangle)$$ Equation 14

$$|\Psi_3\rangle = |x\rangle \begin{pmatrix} Ae^{-f(x)}a[e^{i\phi(x)}|2,0\rangle - e^{-i\phi(x)}|0,2\rangle] + \\ Ae^{-\frac{(x-2\alpha)^2}{4}} b|1,1\rangle \end{pmatrix}$$ Equation 15 where $$f(x) = -\frac{1}{4}(x - 2\alpha\cos(2\theta))^2 \text{ and}$$
$$\phi(x) = \alpha\sin2\theta(x - 2\alpha\cos(2\theta))$$

Figure 7B:
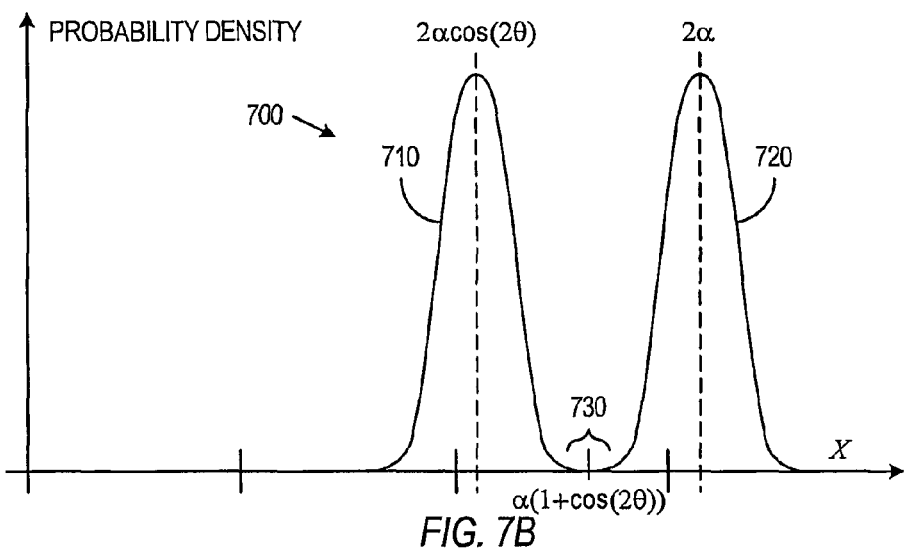
FIG. 7B shows a probability distribution for homodyne measurements taken during analysis of the symmetry of a 2-qubit state.

FIG. 7B shows a probability distribution 700 as a function of the measurement outcome x resulting from homodyne measurement of state $|\Psi_2\rangle$. Probability distribution 700 includes two Gaussian peaks 710 and 720 respectively centered at $2\alpha$ and $2\alpha \cos(2\theta)$ and respectively corresponding to the coefficients of the symmetric and antisymmetric subspace terms in state $|\Psi_3\rangle$ of Equation 15. A measurement outcome equal to an eigenvalue x under Gaussian peak 710 has a near-deterministic probability of corresponding to the symmetric component of state $|\Psi_3\rangle$, and therefore efficiently projects the mode M1 and M2 state onto the Hilbert subspace spanned by symmetric Bell states $|B_2\rangle$, $|B_3\rangle$, and $|B_4\rangle$. A measurement outcome equal to an eigenvalue x under Gaussian peak 720 has a near-deterministic probability of corresponding to the antisymmetric component of state $|\Psi_3\rangle$, and therefore efficiently projects the mode M1 and M2 state onto the single state $|B_1\rangle$. However, a measurement outcome in a region 730, where the tails of both Gaussian distributions 710 and 720 are small (but theoretically non-zero), may not clearly distinguish the symmetric and antisymmetric terms.

Symmetry analyzer 600 can employ a rule that a measurement outcome x above a boundary point, e.g., above a midpoint $x=\alpha(1-\cos(2\theta))$ between the peaks of Gaussian distributions 710 and 720, identifies an antisymmetric state and a measurement outcome x below the boundary point identifies a symmetric state. The probability of error introduced by this rule depends on the integral of the portion of Gaussian distribution 710 extending above the boundary point and the integral of the portion of Gaussian distribution 720 extending below the boundary point. Based on the projected state of Equation 15, the probability $P_{ERROR}$ of error occurring is given in Equation 16 and is less than $10^{-5}$ when the distance between peaks, which is $4\alpha\theta^2$ if $\theta$ is small, is greater than about 9, which shows that operation in the regime of weak cross-Kerr nonlinearities (i.e., $\theta \ll \pi$) is possible.

$$P_{ERROR} = \text{Erfc}(\sqrt{2}\,\alpha\theta^2) \text{ where}$$ Equation 16

$$\text{Erfc}(z) = 1 - \int_{-\infty}^{z} dt \frac{e^{-\frac{1}{2}t^2}}{\sqrt{2\pi}}$$

The error $P_{ERROR}$ can be reduced if symmetry analyzer 600 uses a measurement interpretation rule that counts measurement outcomes x in a selected region (e.g., region 730) as analysis failures and measurement outcomes above or below the boundaries of the selected region as corresponding to an antisymmetric or symmetric measurement result. This type of rule can reduce the error probability at the expense of introducing the chance of a symmetry analysis failure.

In the event that a measurement outcome indicates an antisymmetric state, measurement system 530 in projector 600 activates phase shifters 550 and 560 to remove the measurement dependent phase shifts $\phi(x)$ and $-\phi(x)$ associated with the states $|2,0\rangle$ and $|0,2\rangle$. In an exemplary embodiment, each phase shifter 550 or 560 includes an optical delay line followed by two Pockels cells. There are a variety of methods for introducing an optical delay, such as the cyclical quantum buffer described below, or a fiber loop delay line as described in K. Banaszek and I. Walmsley, "Photon Counting with a Loop Detector," Opt. Lett. 28, 52 (2003). The Pockels cells introduce a linear phase shift for the horizontally and vertically polarized components of each state, and the phase shifts applied depend on the measurement outcome and can be selected using an electrical signal.

The above description of the operation and errors in a subspace projector presumes use of a cross Kerr nonlinearity to introduce phase shifts. While EIT systems such as described above in general may not produce a perfect cross Kerr nonlinearity, EIT systems do provide a suitable approximation of a cross Kerr nonlinearity in typical working regime, for example, when phase shifts are on the order of about 0.1 radian and $\alpha$ is on the order of about 100. Systems other that EIT systems may also be able to provide interactions that are suitably close to a perfect cross Kerr nonlinearity.

Figure 6B:
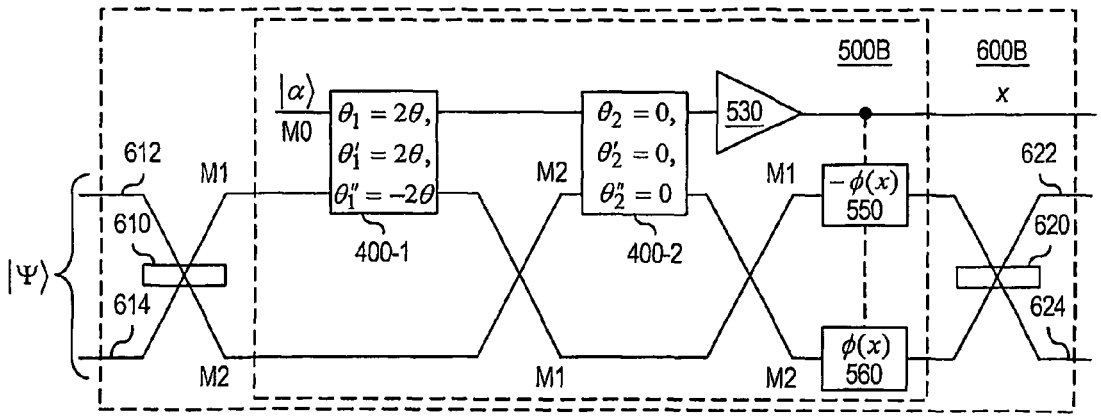

The symmetry analysis in analyzer 600 uses phase shifters 400-1 and 400-2 that provide a phase shift with a non-zero magnitude for states having both photons in one mode M1 or M2 but no phase shift for a state having one photon in each mode M1 and M2. Other subspace projectors using phase shifters with different choices of phase constants can impart similar phase shifts that are also suitable for symmetry analysis of a general 2-qubit state $|\Psi\rangle$. FIG. 6B, for example, illustrates a symmetry analyzer 600B using an alternative 2-mode subspace projector 500B. In subspace projector 500B, the specific choice of phase constants for phase shifter 400-1 are $\theta_1=2\theta$, $\theta'_1=2\theta$, and $\theta''_1=-2\theta$, making phase shifter 400-1 a polarization-preserving phase shifter. The phase constants $\theta_2$, $\theta\alpha_2$, and $\theta''_2$ for phase shifter 400-2 are all zero. Accordingly, phase shifter 400-2 has no effect and can be omitted.

Phase shifter 400-1 in projector 500B shifts the phase of the probe state by $2\theta$ if there are two photons in mode M1, $-2\theta$ if there are two photons in mode M2, and zero if there is one photon in each of the modes M1 and M2. Accordingly, the phase shifts of the relevant states in projector 500B are identical to the phase shifts in projector 500A, and the output state from symmetry analyzer 600B will depend on measurements in the same way as described above for symmetry analyzer 600 of FIG. 6A.

Symmetry analyzer 600B has the advantage of only requiring a single polarization preserving phase shifter 400-1. This advantage may be important, for example, when phase shifters are implemented using EIT systems in which equal but opposite phase shifts may be difficult to implement. However, polarization-preserving phase shifter 400-1 in projector 500B uses controlled phase shifters having phase constants equal to 2θ, instead of phase constants equal to θ, and thus provides the same total phase shift as phase shifters 400-1 and 400-2 in projector 500A.

Symmetry analyzer 600 of FIG. 6A or symmetry analyzer 600B of FIG. 6B can be used as described above to project an arbitrary 2-qubit state either onto the singlet state or onto the Hilbert space spanned by the symmetric Bell states. The projection is non-absorptive so that no signal photons are lost in the projection. Furthermore, the phase relations between different photonic states remain intact. These properties can be used to construct a Bell state analyzer capable of determining which Bell state projection of an analyzed state $|\Psi\rangle$ is output from the analyzer.

Figure 8A:
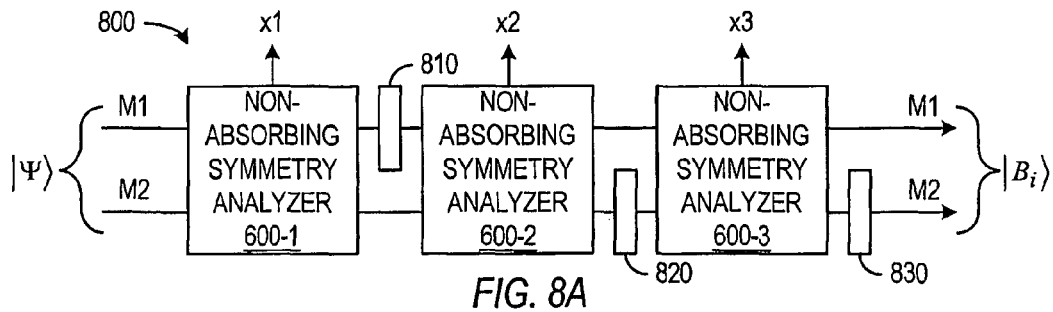
FIGS. 8A and 8B show non-absorbing Bell state analyzers in accordance with alternative embodiments of the invention.

FIG. 8A shows a non-absorbing Bell state analyzer 800 in accordance with an embodiment of the invention. Bell state analyzer 800 includes three non-absorbing symmetry analyzers 600-1, 600-2, and 600-3, which can be identical to non-absorbing symmetry analyzer 600 or 600B of FIG. 6A or 6B. Optical systems 810, 820, and 830 respectively following analyzers 600-1, 600-2, and 600-3 effectively permute the Bell states as described further below.

An analyzed state $|\Psi\rangle$ input to Bell state analyzer 800 can be a general two-qubit state such as represented in Equation 7. Non-absorbing symmetry analyzer 600-1 operates on analyzed state $|\Psi\rangle$ as described above to measure the symmetry of input state $|\Psi\rangle$. As described above, symmetry analyzer 600-1 measures a probe state (not shown) and outputs a measurement signal indicating a measurement outcome x1. The measurement projects analyzed state $|\Psi\rangle$ either into singlet state $|B_1\rangle$ or into the Hilbert space spanned by symmetric Bell states $|B_2\rangle$, $|B_3\rangle$, and $|B_4\rangle$, and the measurement outcome x1 indicates whether the output state from analyzer 600-1 is in the singlet state $|B_1\rangle$ or in a state that is a linear combination of symmetric Bell states $|B_2\rangle$, $|B_3\rangle$, and $|B_4\rangle$.

An optical system 810 transforms the states $|B_1\rangle$, $|B_2\rangle$, $|B_3\rangle$, and $|B_4\rangle$ exiting from symmetry analyzer 600-1 respectively into Bell states $|B_2\rangle$, $|B_1\rangle$, $|B_4\rangle$, and $|B_3\rangle$. In an exemplary embodiment of the invention, optical system 810 is a half-wave plate in mode M1. The half-wave plate can be oriented to introduce a negative sign to the states corresponding to a vertically polarized photon in mode M1 and leave the states of horizontally polarized photons unchanged. This effectively permutes the Bell states in the manner desired.

Symmetry analyzer 600-2 then detects whether or not the transformed state from optical system 810 is singlet state $|B_1\rangle$. Measurement of the probe state in symmetry analyzer 600-2 provides a measurement outcome x2 and again projects the 2-qubit state either into singlet state $|B_1\rangle$ or the Hilbert space spanned by symmetric Bell states $|B_2\rangle$, $|B_3\rangle$, and $|B_4\rangle$. More specifically, the output state of analyzer 600-2 will be singlet state $|B_1\rangle$ if measurement outcome x2 indicates an antisymmetric Bell state, Bell state $|B_2\rangle$ if measurement outcome x1 from analyzer 600-1 indicated an antisymmetric Bell state, or a linear combination of Bell states $|B_3\rangle$ and $|B_4\rangle$ if neither measurement outcome x1 or x2 indicates an antisymmetric state.

Optical system 820 further transforms the output state on modes M1 and M2 from symmetry analyzer 600-2. In an exemplary embodiment of the invention, optical system 820 is a half-wave plate in mode M2. The half-wave plate is oriented to transform state $|B_2\rangle$ to $|B_3\rangle$, state $|B_1\rangle$ to $|B_4\rangle$, state $|B_4\rangle$ to $|B_1\rangle$, and state $|B_3\rangle$ to $|B_2\rangle$. As a result, Bell state components $|B_1\rangle$, $|B_2\rangle$, $|B_3\rangle$, and $|B_4\rangle$ of the original input state $|\Psi\rangle$ respectively correspond to states $|B_3\rangle$, $|B_4\rangle$, $|B_1\rangle$, and $|B_2\rangle$ when output from optical system 820.

Symmetry analyzer 600-3 then analyzes whether or not the transformed state from optical system 820 is in singlet state $|B_1\rangle$. If measurement outcome x3 from symmetry analyzer 600-3 corresponds to singlet state $|B_1\rangle$, the output state from analyzer 600-3 is state $|B_1\rangle$. Otherwise, the output state from analyzer 600-3 is in the symmetric Hilbert subspace. More specifically, the output state of analyzer 600-3 will be singlet state $|B_1\rangle$ if the measurement outcome x3 from analyzer 600-3 indicates an antisymmetric Bell state, Bell state $|B_4\rangle$ if the measurement outcome x2 from analyzer 600-2 indicated an antisymmetric state, or Bell state $|B_3\rangle$ if the measurement outcome x1 from analyzer 600-1 indicated an antisymmetric Bell state, or Bell state $|B_2\rangle$ if none of the measurement outcomes x1, x2, and x3 that indicates an antisymmetric state.

Optical system 830, which can be implemented using a half-wave plate with an appropriate orientation in mode M2, transforms the output state from symmetry analyzer 600-3 by converting state $|B_3\rangle$ to $|B_1\rangle$, state $|B_4\rangle$ to $|B_2\rangle$, state $|B_1\rangle$ to $|B_3\rangle$, and state $|B_2\rangle$ to $|B_4\rangle$. Accordingly, the output state from analyzer 800 will be Bell state $|B_1\rangle$ if the measurement outcome x1 from analyzer 600-1 indicates antisymmetry, Bell state $|B_2\rangle$ if the measurement outcome x2 from analyzer 600-2 indicates antisymmetry, Bell state $|B_3\rangle$ the measurement outcome x3 from analyzer 600-3 indicates antisymmetry, and Bell state $|B_4\rangle$ if none of the measurement outcomes x1, x2, or x3 indicates antisymmetry. Accordingly, the measurement signals from analyzers 600-1 to 600-3 thus indicate the output Bell state output from analyzer 800'.

Figure 8B:
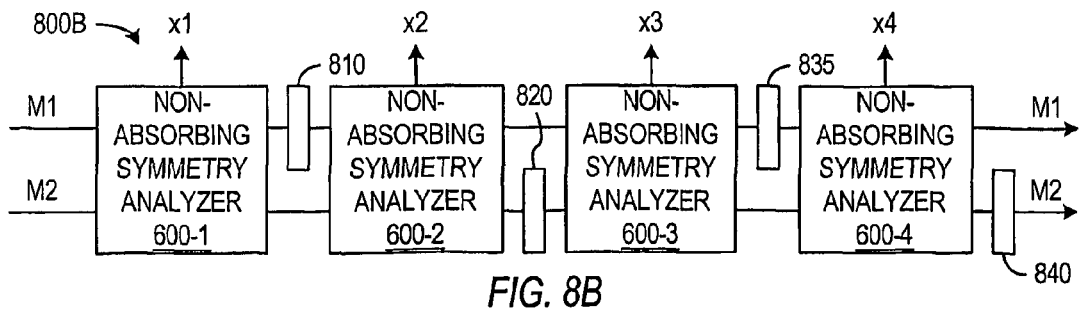

Non-absorbing Bell state analyzer 800 relies on failures of detectors 600-1, 600-2, and 600-3 to detect antisymmetry as the measurement signature and corresponding projection onto Bell state $|B_4\rangle$. In this case, inefficiency or error in measurements could result in an analyzer 600-1, 600-2, and 600-3 failing to detect the singlet state, which results in false identification of Bell state $|B_4\rangle$. A Bell state analyzer 800B illustrated in FIG. 8B employs an additional symmetry analyzer 600-4 to distinguish detector failure from detection of Bell state $|B_4\rangle$.

Analyzer 800B uses transformation optics 835 following symmetry analyzer 600-3. Instead of undoing the previous transformations of optical system 810 and 820, optical system 835 transform state $|B_3\rangle$ to $|B_4\rangle$, state $|B_4\rangle$ to $|B_3\rangle$, state $|B_1\rangle$ to $|B_2\rangle$, and state $|B_2\rangle$ to $|B_1\rangle$. Accordingly, if the output state from analyzer 600-3 was Bell state $|B_2\rangle$, the measurement signal from analyzer 600-4 should indicate the antisymmetric state $|B_1\rangle$. Optical system 840 transforms the state $|B_4\rangle$ to $|B_1\rangle$, state $|B_3\rangle$ to $|B_2\rangle$, state $|B_2\rangle$ to $|B_3\rangle$, and state $|B_1\rangle$ to $|B_4\rangle$. The output state from analyzer 800B will be Bell state $|B_1\rangle$ if the measurement signal outcome x1 from analyzer 600-1 indicates antisymmetry, Bell state $|B_2\rangle$ if the measurement outcome x2 from analyzer 600-2 indicates antisymmetry, Bell state $|B_3\rangle$ if the measurement outcome x3 from analyzer 600-3 indicates antisymmetry, and Bell state $|B_4\rangle$ if the measurement outcome x4 from analyzer 600-3 indicates antisymmetry. The failure of any measurement x1, x2, x3, or x4 to indicate antisymmetry or more than one measurement indicating antisymmetry indicates an analysis failure.

Non-absorbing symmetry analyzers such as analyzers 600 and 600B and Bell state analyzers such as analyzers 800 and 800B can be used in quantum information processing systems that analyze an input state and then use the analysis result to control feed forward operations. A useful device for feed forward systems is a Cyclical Quantum Buffer (CQB).

Figure 9:
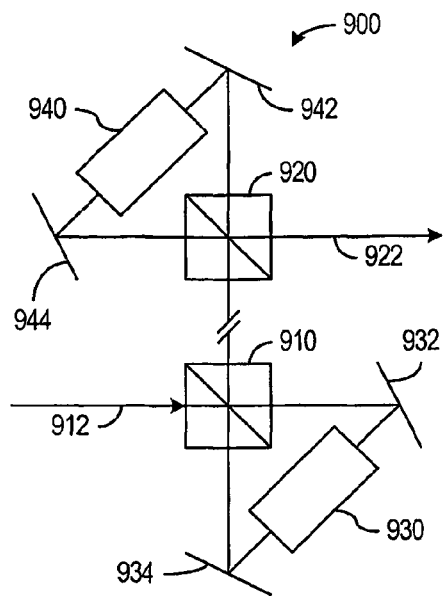
FIG. 9 shows an electro-optic mirror system with photon storage suitable for use in quantum information processing systems in accordance with embodiments of the invention.

FIG. 9 shows an embodiment of a CQB 900 that includes two polarizing beam splitters 910 and 920 and two electro-optic Pockels cells 930 and 940. Polarizing beam splitter 910 has an input port 912 and can receive an input photonic state containing horizontally and vertically polarized component states. Polarizing beam splitter 920 has an output port 922. Each polarizing beam splitter 910 and 920 has the same orientation, e.g., to transmit the horizontally polarized photons and reflect the vertically polarized photons.

Each of the Pockels cells 930 and 940 is configured so that when a Pockels cell 930 or 940 is "on", the Pockels cell 930 or 940 transforms horizontally polarized photons to vertically polarized photons and transforms vertically polarized photons to horizontally polarized photons, e.g., swaps polarization states $|H\rangle \leftrightarrow |V\rangle$. When "off", Pockels cell 930 or 940 leaves the photonic state unchanged. Pockels cell 930 has associated turning mirrors 932 and 934 oriented so that a light path through Pockels cell 930 forms a triangular ring having a vertex on mirror 932, a vertex on mirror 934, and a vertex on a polarizing coating within PBS 910. Similarly, Pockels cell 940 has associated turning mirrors 942 and 944 oriented so that a light path through Pockels cell 940 forms a triangular ring having vertices on mirror 942, mirror 944, and within PBS 920.

CQB 900 can be operated to store a photonic state, transmit a photonic state, or to reflect a photon after a swap of linear polarizations. For prompt transmission of a photonic state without a swap of horizontal and vertical polarizations, both Pockels cell 930 or 940 are turned off. For a state input via an input port 912, PBS 910 transmits the horizontally polarized component, which then traverses in a clockwise sense the ring including Pockels cell 930, propagates through PBS 910 and PBS 920, traverses in a counterclockwise sense the ring including Pockels cell 940, and exits through PBS 920. PBS 910 reflects the vertically polarized component, which then traverses in a counterclockwise sense the ring including Pockels cell 930, again reflects from PBS 910, propagates to and reflects from PBS 920, traverses in a clockwise sense the ring including Pockels cell 940, and after a second reflection from PBS 920 exits on an output port 922. The optical path length of CQB 900 is the same for both polarization component states during a prompt transmission without a polarization swap.

For prompt reflection of a photonic state with a swap of horizontal and vertical polarizations, one Pockels cell 930 can be turned on, while the other Pockels cell 940 can be on or off. The horizontal polarization component from input port 912 traverses PBS 910 and is reflected from turning mirror 932 into Pockels cell 930, which transforms the horizontally polarized photon(s) into vertically polarized photon(s). The transformed photonic state then reflects from PBS 910 and exit back along input port 912. An input vertically polarized component initially reflects from PBS 910, traverses the ring including Pockels cell 930 where the vertical polarization is switched to a horizontal polarization that is transmitted through PBS 910 to exit back along the input port 912.

Operation of EOM 900 for storage can use a clock cycle that corresponds to a Prompt transmission time for a photon to traverse the ring associated with Pockels cell 930 or 940. Propagation times elsewhere in CQB 900, e.g., for transmission from PBS 910 to PBS 920 can be synchronized to the clock cycle, but the distance between PBS 910 and PBS 920 can be made long to provide an optical delay. For a storage operation, both Pockels cells 930 and 940 are turned on only after the first pass of the photonic state through the ring including Pockels cell 930. With both Pockels cells 930 and 940 on, the horizontal and vertical polarization components follow figure-eight paths including the rings through Pockels cells 930 and 940. The component state that is initially horizontally polarized traverses the figure-eight path in a different direction from that of the component state that is initially vertically polarized. To transmit a photonic state with the original polarization (after a chosen delay time), Pockels cell 940 is turned off, and the photonic state exits on from PBS 920 via output port 922. To reflect a photonic state with a swapped polarization (after a chosen delay time), Pockels cell 930 is turned off, and the photonic state exits from PBS 910 back along input port 912.

When used as a storage device, CQB 900 has the advantage of being insensitive to birefringent dephasing because each polarization component alternates between being vertically and horizontally polarized as the polarization component cycles through each ring. Further, since different polarizations traverse the same paths, albeit in opposite directions, acoustic vibrations in structures such as turning mirrors 932, 934, 942, and 944 have matching effects on both components. The primary decoherence mechanism in CQB 900 is loss due to scattering and absorption of photons.

Figure 10:
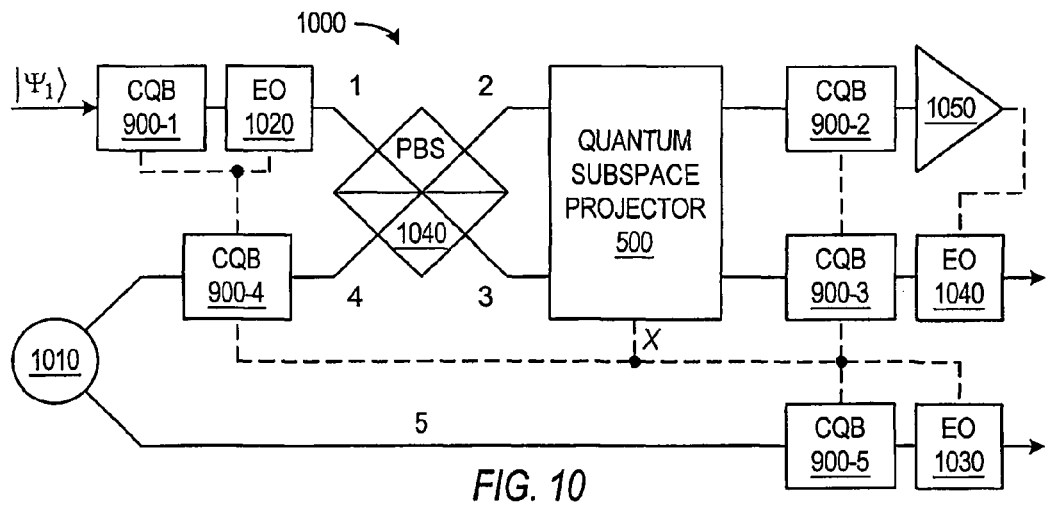
FIG. 10 shows a non-absorbing encoder in accordance with an embodiment of the invention.

FIG. 10 shows a non-absorbing encoder 1000 that employs a 2-mode quantum subspace projector 500 and five CQBs 900-1 to 900-5. Quantum subspace projector 500 can be substantially identical to quantum subspace projector 500A or 500B of FIGS. 6A and 6B, and CQBs 900-1 to 900-5 can each be substantially identical to CQB 900 of FIG. 9 as described above. Non-absorbing encoder 1000 further includes a source 1010 of entangled photon pairs, electro-optic Pockels cells 1020 and 1030, a polarizing beam splitter 1040, and a detector 1050.

In operation, CQBs 900-1 and 900-4 and Pockels cell 1020 are initially off for prompt transmission. An input state $|\Psi_1\rangle$, which represents a qubit being encoded, can then enter encoder 1000 via CQB 900-1. Simultaneous with input of state $|\Psi_1\rangle$, source 1010, which may be a parametric down converter, a Bell state analyzer, or any suitable source of entangled photons, generates an entangled photon pair in the Bell state $|B_4\rangle$. Equations 17 give states $|\Psi_1\rangle$ and $|B_4\rangle$ in terms of horizontal and vertical polarization states $|H_i\rangle$ and $|V_i\rangle$, wherein a subscript i indicates the photon mode traversing CQB 900-i.

$$|\Psi_1\rangle = q0|H_1\rangle + q1|V_1\rangle \qquad \text{Equations 17}$$
$$|B_4\rangle = \frac{1}{\sqrt{2}}[|H_4 H_5\rangle + |V_4 V_5\rangle]$$

Photons in modes 1 and 4 are incident on PBS 1040, and PBS 1040 outputs photons in modes 2 and 3. The action of PBS 1040 transforms the input product state as indicated in Equation 18. As shown, the first two terms of the transformed state of Equation 18 have one photon in each of modes 2 and 3. The last two terms of the transformed state of Equation 18 have two photons in either mode 3 or 2 and no photons in the other mode 2 or 3.

$$(q0|H_1\rangle + q1|V_1\rangle) \otimes \frac{1}{\sqrt{2}}[|H_4 H_5\rangle + |V_4 V_5\rangle] \rightarrow \qquad \text{Equation 18}$$

-continued $$\frac{q0}{\sqrt{2}}|H_2H_3H_5\rangle + \frac{q1}{\sqrt{2}}|V_2V_3V_5\rangle +$$

$$\frac{q0}{\sqrt{2}}|H_3V_3V_5\rangle + \frac{q1}{\sqrt{2}}|H_2V_2H_5\rangle$$

Quantum subspace projector 500 analyzes the state corresponding to modes 2 and 3 and projects the modes 2 and 3 of the transformed state either onto the Hilbert subspace corresponding to the presence of a single photon in each of modes 2 and 3, or onto the Hilbert subspace described by either zero photons or two photons in mode 2 and either two or zero photons in mode 3. If the measurement outcome x from projector 500 identifies a single photon in mode 2, the projected state $|P_1\rangle$ after the measurement is given by Equation 19, and encoder 1000 has succeeded in encoding $|\Psi_1\rangle$ as a triplet of maximally entangled photons.

$$|P_i\rangle = q0|H_2H_3H_5\rangle + q1|V_2V_3V_5\rangle \quad \text{Equation 19}$$

If quantum subspace projector 500 does not produces a measurement outcome indicating the singlet state, the projected state $|P_0\rangle$ after the measurement is given by Equation 20. The measurement signal from projector 500 controls CQBs 900-2 and 900-3 so that the photons in modes 2 and 3 return back to PBS 1040, which transforms the state of Equation 20 to the form given in Equation 21. Also in response to the measurement signal, CQB 900-5 can then store the mode 5 photonic state while the mode 2 and 3 photons are being returned. In an alternative embodiment of the invention, CQB 900-5 could be replaced with an optical delay line that simply delays output of the mode 5 photon until the mode 2 and 3 photons are ready.

$$|P_0\rangle = q0||H_3V_3V_5\rangle + q1|H_2V_2H_5\rangle \quad \text{Equation 20}$$

$$|P_0\rangle \rightarrow q0|H_1V_4V_5\rangle + q1|V_1H_4H_5\rangle \quad \text{Equation 21}$$

CQBs 900-1 and 900-4 are then configured to reflect the mode 1 and 4 photons, and electro-optic Pockels cell 1020 is operated to act as a quarter-wave plate. Passing twice through cell 1020 undoes the polarization swap that occurred in mode 1 during reflection in CQB 900-1. However, the reflection in CQB 900-4 swaps the horizontal and vertical polarizations of the mode 4 state, transforming the state to the form given by the left hand side term of Equation 22. PBS 1040 transforms this state after the reflections from CQB 900-1 and 900-4 to the form given by the right hand side of Equation 22. CQB 900-2 and 900-3 are then switched to transmit mode 2 and 3 photons, and EOM 900-5 simultaneously releases the mode 5 photon. Electro-optic Pockels cell 1030 then performs a polarization swap that places the mode 2, 3, and 5 photons in the desired state $|P_1\rangle$ given in Equation 19. Accordingly, neglecting losses, encoder 1000 can produce state $|P_1\rangle$ 100% of the time regardless of the specific measurement result x.

$$q0|H_1H_4V_5\rangle + q1|V_1V_4H_5\rangle \rightarrow q0|H_2H_3V_5\rangle$$
$$+ q1|V_2V_3H_5\rangle \quad \text{Equation 22}$$

A detector 1050 can detect whether the photonic state in mode 2 has a polarization state $|F_2\rangle$ or $|S_2\rangle$. This measurement projects the state $|P_1\rangle$ into a subspace depending on the measurement outcome. Feed forward operations based partly on the measurement can then correct the projected state as required for use with a destructive CNOT gate such as described below or a destructive CNOT gate such as described by T. B: Pittman, B. C. Jacobs, and J. D. Franson, "Probabilistic Quantum Logic Operations Using Polarizing Beam Splitters," Phys. Rev. A, Vol. 64, 062311 (2001). To permit use of the mode 2 photon after detection, detector 1050 can be a non-absorbing detector such as described by W. J. Munro, K. Nemoto, R. G. Beausoleil, and T. P. Spiller, "A High-Efficiency Quantum Non-Demolition Single Photon Number Resolving Detector," Phys. Rev. A 71, 033819 (2005). Additionally, the measurement from detector 1050 can control an electro-optic Pockels cell 1040 to correct the mode 3 photonic state as needed in the CNOT gate of Pittman et al.

Figure 11:
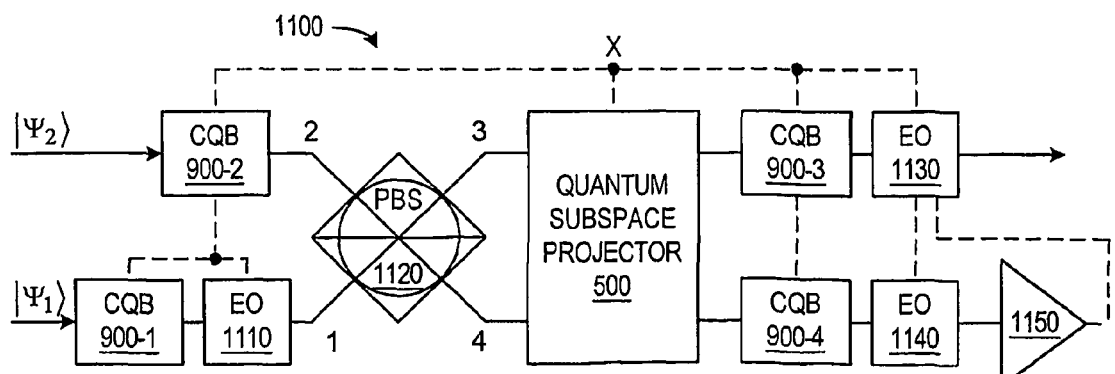
FIG. 11 shows a CNOT gate in accordance with an embodiment of the invention employing a quantum subspace projector.

FIG. 11 shows a destructive CNOT gate 1100 in accordance with an embodiment of the invention using a quantum subspace projector 500 and four CQBs 900-1 to 900-4. CNOT gate 1100 also includes a 45° polarizing beam splitter 1120 and three electro-optic Pockels cells 1110, 1130, and 1140. In an exemplary operation that is described further below, a target state $|\Psi_1\rangle$ is input to CQB 900-1 and a control state $|\Psi_2\rangle$ is input to CQB 900-2. It should be understood, however, that the states of the input modes of CNOT gate 1100 may be entangled with each other or with the quantum states of other systems (not shown).

With CQBs 900-1 and 900-2 and Pockels cell 1110 all off, a general input state $|\Psi_1\rangle$ of the form given in Equations 17 is input to EOM 900-1. A control state $|\Psi_2\rangle$ that is a vertically polarized state $|V_2\rangle$ is initially assumed as the input to CQB 900-2 for the purpose of determining the effect of CNOT gate 1100 on input state $|\Psi_1\rangle$. The case where the control state is horizontally polarized is considered below.

The product state as given by Expression 23 and described above is applied to 45° PBS 1120, which transforms the input state to the form given by Equation 24. Equation 24 shows that the output state from 45° PBS 1120 (expressed in the HV basis measured by detector 1150) includes a term that is a superposition of states having one photon in each of modes 3 and 4 and a term that is a superposition of states having two photons in one mode 3 or 4 and no photons in the other mode 4 or 3.

$$|\Psi_1\rangle \otimes |V_2\rangle = \frac{1}{\sqrt{2}}\left[\begin{array}{l}q0(|F_1\rangle - |S_1\rangle) + \\ q1(|F_1\rangle + |S_1\rangle)\end{array}\right] \otimes \frac{1}{\sqrt{2}}(|F_2\rangle + |S_2\rangle) \quad \text{Equation 23}$$

where $|F_i\rangle = \frac{1}{\sqrt{2}}(|H_i\rangle + |V_i\rangle)$ and $|S_i\rangle = \frac{1}{\sqrt{2}}(-|H_i\rangle + |V_i\rangle)$ $$\frac{1}{2}\left[\begin{array}{l}(q0+q1)|F_3F_4\rangle - \\ (q0-q1)|S_3S_4\rangle\end{array}\right] + \frac{1}{2}\left[\begin{array}{l}(q0+q1)|F_3S_3\rangle - \\ (q0-q1)|F_4S_4\rangle\end{array}\right] = \quad \text{Equation 24}$$

$$\frac{1}{2}\left[\begin{array}{l}q0(|V_3H_4\rangle + |H_3V_4\rangle) + \\ q1(|H_3H_4\rangle + |V_3V_4\rangle)\end{array}\right] + \frac{1}{4}\left[\begin{array}{l}(q0-q1)(|H_4^2\rangle + |V_4^2\rangle) - \\ (q0+q1)(|H_3^2\rangle + |V_3^2\rangle)\end{array}\right]$$

Quantum subspace projector 500 analyzes the state corresponding to modes 3 and 4, and projects the state on to either the single-photon term or the zero/two-photon term of Equation 24, depending on a measurement outcome x. The states of modes 3 and 4 are then stored in CQBs 900-3 and 900-4, respectively. If the measurement outcome x indicates projection to the single-photon term, the stored photons in CQBs 900-3 and 900-4 can be released without change. Measurements from polarization-sensitive detector 1150 can be used in a manner described by Pittman et al. to control Pockels cell 1130 and implement a nondestructive CNOT gate. Comments made above describing other embodiments of detector 1050 in FIG. 10 can be applied to detector 1150 in FIG. 11.

If the measurement outcome x indicates projection onto the zero/two-photon term of Equation 24, CQBs 900-3 and 900-4 can return the stored photonic states to 45° PBS 1020. The 45° PBS 1020 transforms the returned state as indicated in Equation 25. CQB 900-1 and Pockels cell 1110 are then activated to reflect the photonic state in mode 1 without causing a polarization exchange, and CQB 900-2 is activated to reflect the photonic state in mode 2 with a polarization exchange.

$$\frac{1}{2}\begin{bmatrix}(q0+q1)|F_3S_3\rangle - \\ (q0-q1)|F_4S_4\rangle\end{bmatrix} \xrightarrow{PBS} \frac{1}{2}\begin{bmatrix}(q0+q1)|S_1F_2\rangle - \\ (q0-q1)|F_1S_2\rangle\end{bmatrix} \quad \text{Equation 25}$$

After returning through 45° PBS 1020, the state takes the form given on the left hand side of Equation 26. CQB 900-3 and Pockels cell 1130 are activated to exchange the polarization states of photons in mode 3, and CQB 900-4 and Pockels cell 1140 are activated to exchange the polarization states of photons in mode 4, resulting in the transformation as indicated in Equation 26 to the appropriate output state when the input control state is vertically polarized. The right hand side of Equation 26 is identical to the first term on the left hand side of Equation 24; therefore, the gate is now certain to succeed (following the protocol of Pittman et al.)

$$\frac{1}{2}\begin{bmatrix}(q0+q1)|S_3S_4\rangle - \\ (q0-q1)|F_3F_4\rangle\end{bmatrix} \rightarrow \frac{1}{2}\begin{bmatrix}(q0+q1)|F_3F_4\rangle - \\ (q0-q1)|S_3S_4\rangle\end{bmatrix} \quad \text{Equation 26}$$

If the control state is assumed to be horizontally polarized when input to EOM 900-2, a similar analysis to the above can be performed to show that the state output from 45° PBS 1120 is given by Equation 27. Equation 27 is the same as Equation 24 except for a swap of states $|H_3\rangle$ and $|V_3\rangle$. This is exactly the expected behavior required for successful operation of a destructive CNOT gate. Therefore, the procedure described above for the vertically-polarized control state can be followed to ensure that CNOT gate 1100 will function properly with a horizontally-polarized control state.

$$\frac{1}{2}\begin{bmatrix}(q0+q1)|F_3F_4\rangle + \\ (q0-q1)|S_3S_4\rangle\end{bmatrix} - \frac{1}{2}\begin{bmatrix}(q0+q1)|F_3S_3\rangle + \\ (q0-q1)|F_4S_4\rangle\end{bmatrix} = \quad \text{Equation 27}$$

$$\frac{1}{2}\begin{bmatrix}q0(|H_3H_4\rangle + |V_3V_4\rangle) + \\ q1(|V_3H_4\rangle + |H_3V_4\rangle)\end{bmatrix} + \frac{1}{4}\begin{bmatrix}(q0+q1)(|H_3^2\rangle - |V_3^2\rangle) + \\ (q0-q1)(|H_3^2\rangle - |V_3^2\rangle)\end{bmatrix}$$

A nondestructive CNOT gate can be constructed by combining quantum encoder 1000 with destructive CNOT gate 1100. In this case, the output of Pockels cell 1030 in FIG. 10 can be directed to the input of CQB 900-2 in FIG. 11. Measurements from detectors 1050 and 1150 can be used in a manner described by Pittman et al. to implement a nondestructive CNOT gate that operates near-deterministically.

Figure 12A:
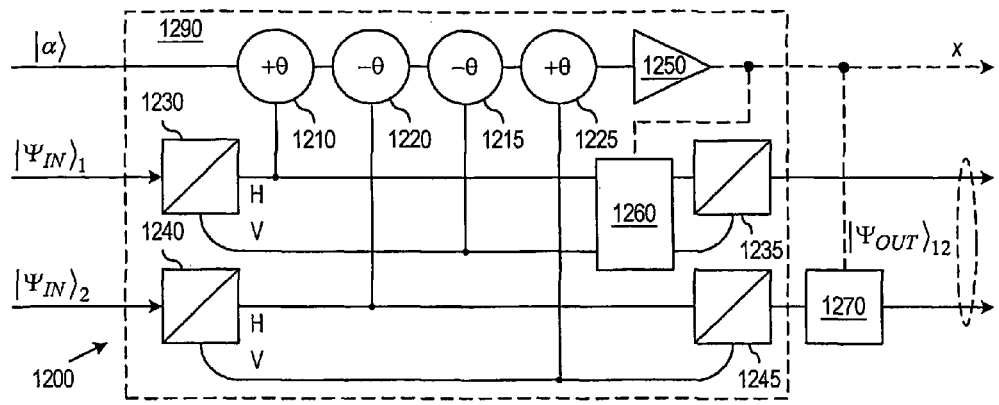
FIGS. 12A, 12B, and 12C illustrates entanglers in accordance with alternative embodiments of the invention.

A nondestructive CNOT gate in accordance with another embodiment of the invention can employ near-deterministic entanglers, parity detectors, or other quantum gates containing controlled phase shifters. FIG. 12A illustrates an embodiment of an entangler 1200 based on a parity detector 1290 in accordance with an embodiment of the invention. Parity detector 1290 includes four controlled phase shifters 1210, 1215, 1220, and 1225 that act on a coherent probe state $|\alpha\rangle$. Each phase shifter 1210, 1215, 1220, or 1225 can be implemented using variety of structures including, for example, the systems using EIT as described above in regard to FIGS. 1 and 2A or systems using structures such as whispering-gallery micro-resonators, optical fibers, doped optical fibers or photonic crystal fibers, or cavity QED systems that can also create approximate cross Kerr nonlinearities. As shown in FIG. 12A, phase shifters 1210 and 1225 have equal positive phase constants $+\theta$, and phase shifters 1220 and 1215 have equal negative phase constants $-\theta$. Distinct polarization components of a first input mode control controlled phase shifters 1210 and 1215, and distinct polarization components of a second input mode control controlled phase shifters 1220 and 1225.

FIG. 12A illustrates an example in which the two input modes are in respective photonic states $|\Psi_{IN}\rangle_1$ and $|\Psi_{IN}\rangle_2$, which are to be entangle, but the input modes for parity detector 1290 may more generally be in an entangled state that cannot be expresses as a product of input states. For the illustrated example, the two input states have the general forms $|\Psi_{IN}\rangle_1 = c_0|H_1\rangle + c_1|V_1\rangle$ and $|\Psi_{IN}\rangle_2 = d_0|H_2\rangle + d_1|V_2\rangle$ to represent qubits using polarization representations. Polarizing beam-splitters 1230 and 1240 respectively split input states $|\Psi_{IN}\rangle_1$ and $|\Psi_{IN}\rangle_2$ into spatial modes having orthogonal linear polarizations that then interact with a probe state $|\alpha\rangle$ via cross Kerr nonlinearities implemented in phase shifters 1210, 1215, 1220, and 1225. More specifically, a horizontal polarization component $c_0|H\rangle_1$ of state $|\Psi_{IN}\rangle_1$ controls phase shifter 1210, and a vertical polarization component $c_1|V\rangle_2$ of state $|\Psi_{IN}\rangle_1$ controls phase shifter 1215. A horizontal polarization component $d_0|H\rangle_2$ of state $|\Psi_{IN}\rangle_2$ controls phase shifter 1220, and a vertical polarization component $d_1|V\rangle_2$ of state $|\Psi_{IN}\rangle_2$ controls phase shifter 1225. PBS 1235 and 1245 recombine the horizontal and vertical components after operation of phase shifters 1210, 1215, 1220, and 1225.

Before a homodyne detector 1250 measures the probe state, the action of parity detector 1290 evolves the combined input state $|\Psi_1\rangle|\Psi_2\rangle|\alpha\rangle$ as shown in Equation 28. Equation 28 shows that the even-parity components $|HH\rangle$ and $|VV\rangle$ cause no phase shift in the probe state $|\alpha\rangle$ and remain coherent with respect to each other. The odd-parity components $|HV\rangle$ and $|VH\rangle$ cause respective phase shifts $2\theta$ and $-2\theta$, which could allow a general homodyne/heterodyne measurement to distinguish states $|HV\rangle$ and $|VH\rangle$. However, an X-quadrature homodyne measurement as described above will not distinguish the states $|\alpha e^{\pm i2\theta}\rangle$ if $\alpha$ is initially real. More specifically, with $\alpha$ real, an X-quadrature homodyne measurement projects the state of Equation 28 onto an eigenstate of the X-quadrature operator as indicated in Equation 29.

$$|\Psi_1\rangle|\Psi_2\rangle|\alpha\rangle \rightarrow \begin{bmatrix}c_0 d_0|HH\rangle + \\ c_1 d_1|VV\rangle\end{bmatrix}|\alpha\rangle + \quad \text{Equation 28}$$

$$c_0 d_1|HV\rangle|\alpha e^{i2\theta}\rangle + c_1 d_0|VH\rangle|\alpha e^{-i2\theta}\rangle$$

$$\xrightarrow{X} |x\rangle \begin{pmatrix} f(x,\alpha)\begin{bmatrix}c_0 d_0|HH\rangle + \\ c_1 d_1|VV\rangle\end{bmatrix} + \\ f(x, \alpha\cos(2\theta))\begin{bmatrix}c_0 d_1 e^{i\phi(x)}|HV\rangle + \\ c_1 d_0 e^{-i\phi(x)}|VH\rangle\end{bmatrix} \end{pmatrix} \quad \text{Equation 29}$$

where $f(x, \beta) = \frac{1}{2\sqrt{\pi}}\exp\left[-\frac{1}{4}(x-2\beta)^2\right]$ and $\phi(x) = \alpha x \sin 2\theta - \alpha^2 \sin 4\theta$ A measurement outcome x from homodyne detector 1250 thus projects the state output from PBSs 1235 and 1245 with high probability to either state $c_0 d_0|HH\rangle + c_1 d_1|VV\rangle$ (an even parity state) or to state $c_0 d_1 e^{i\phi(x)}|HV\rangle + c_1 d_0 e^{-i\phi(x)}|VH\rangle$ (an odd parity), depending on the value of measurement outcome x. The measurement thus detects the parity and thereby splits the even parity terms nearly deterministically from the odd parity terms. The choice to call states $|HH\rangle$ and $|VV\rangle$ the even parity states and call states $|HV\rangle$ and $|VH\rangle$ the odd parity states is an arbitrary choice that is primarily dependent on the form/type of PBSs 1230 and 1240 used to convert the polarization encoded qubits $|\Psi_{IN}\rangle_1$ and $|\Psi_{IN}\rangle_2$ to path encoded qubits. Any other choice is also acceptable and does not need to be symmetric between the two qubits $|\Psi_{IN}\rangle_1$ and $|\Psi_{IN}\rangle_2$.

The output odd parity state $c_0 d_1 e^{i\phi(x)} |HV\rangle + c_1 d_0 e^{-i\phi(x)} |VH\rangle$ is dependent on the measurement outcome x. However, one or more phase shifters 1260 responsive to measurement signal x can change the odd-parity state to a state $c_0 d_1 |HV\rangle + c_1 d_0 |VH\rangle$ that is independent of the measurement outcome x. In particular, a single phase shift of $\phi(x)$ or $-\phi(x)$ on one of the four modes input modes of PBSs 1235 and 1245 can produce the state $c_0 d_1 |HV\rangle + c_1 d_0 |VH\rangle$ up to an overall phase factor. For the phase correction, the homodyne measurement should be accurate enough for feed forward to create a state that is independent of the measurement x. In practice, this means that the uncertainty in the X quadrature measurement should be much less than about $2\pi/(\alpha \sin(\theta))$, which can generally be achieved using a local oscillator that is much more intense that the probe state.

Parity detector 1290 thus has a classical output signal x that near-deterministically indicates a measured parity. Further, parity detector is non-absorbing in that parity detector 1290 provides an output photon state having the measure parity, e.g., $c_0 d_0 |HH\rangle + c_1 d_1 |VV\rangle$ for an even parity measurement result or $c_0 d_1 |HV\rangle + c_1 d_1 |VH\rangle$) for an odd parity measurement result.

Non-absorbing parity detector 1290 can act as described above to project a 2-qubit input state onto the two-dimensional subspace of even parity states or the two-dimensional subspace of odd parity states. The non-absorbing symmetry analyzers such as described above in regard to FIGS. 6A and 6B can similarly project a two-qubit input state onto a one-dimensional subspace corresponding to the antisymmetric or singlet Bell state or a three dimensional subspace corresponding to the symmetric Bell states. Projections of 2-qubit states to other one, two, or three dimensional subspaces can be achieved through addition of state transformation optics, e.g., wave plates that change the polarizations of input and output states.

With the appropriate choice of amplitudes $c_0$, $c_1$, $d_0$, and $d_1$ in the input states qubits $|\Psi_{IN}\rangle_1$ and $|\Psi_{IN}\rangle_2$, feed forward transformations in entangler 1200 can create arbitrary entangled states near deterministically. For instance if $d_0$ and $d_1$ are equal to $$\frac{1}{\sqrt{2}},$$

entangler 1200 outputs either even parity state $c_0 |HH\rangle + c_1 |VV\rangle$ or odd parity state $c_0 |HV\rangle + c_1 |VH\rangle$. In this exemplary embodiment, state $c_0 |HH\rangle + c_1 |VV\rangle$ is the desired entangled state for encoding qubit coefficients $c_0$ and $c_1$. Accordingly, no change in the output state of non-absorbing parity detector 1290 is required when the measurement signal x indicates even parity. A bit flip 1270, which can be implemented through a classically controlled polarization rotator, can act on the second output mode when measurement signal x indicates the odd-parity state, so that the odd-parity state $c_0 |HV\rangle + c_1 |VH\rangle$ becomes the desired entangled state $c_0 |HH\rangle + c_1 |VV\rangle$. System 1200 can thus be configured to acts as a near deterministic entangler.

The features of entangler 1200 can be varied to use different configurations of non-absorbing parity detectors to create entanglers in accordance with some alternative embodiments of the invention. For example, in the above-described embodiment illustrated in FIG. 12A, horizontal and vertical polarization components of a first input mode/qubit respectively control controlled phase shifters 1210 and 1215, and horizontal and vertical polarization components of a second input mode/qubit respectively control controlled phase shifters 1220 and 1225. The phase constants of phase shifters 1210 and 1220, which horizontal polarization components control, are opposite so that state $|HH\rangle$ causes no net phase shift in the probe state. Similarly, the phase constants of phase shifters 1215 and 1225, which vertical polarization components control, are opposite so that state $|VV\rangle$ causes no net phase shift in the probe state. Alternative configurations can use different components of the input modes/qubits for control of phase shifters 1210, 1215, 1220, and 1215, for example, so that states $|HV\rangle$ and $|VH\rangle$ cause no net phase shift. Alternatively, 45° polarizing beam splitter or beam splitters with polarization altering elements can be used so that different polarization component cause no net phase shift, for example, so that states $|H+V, H+V\rangle$ and $|H-V, H-V\rangle$ or another pair of polarization states cause no net phase shift. More generally, a parity detector can be designed, so that a homodyne measurement in the parity detector projects an input state onto any desired two-dimensional subspace of 2-qubit states. With feed forward as described above, the parity detectors can be used with readily apparent modifications to generate entangled states.

Figure 12B:
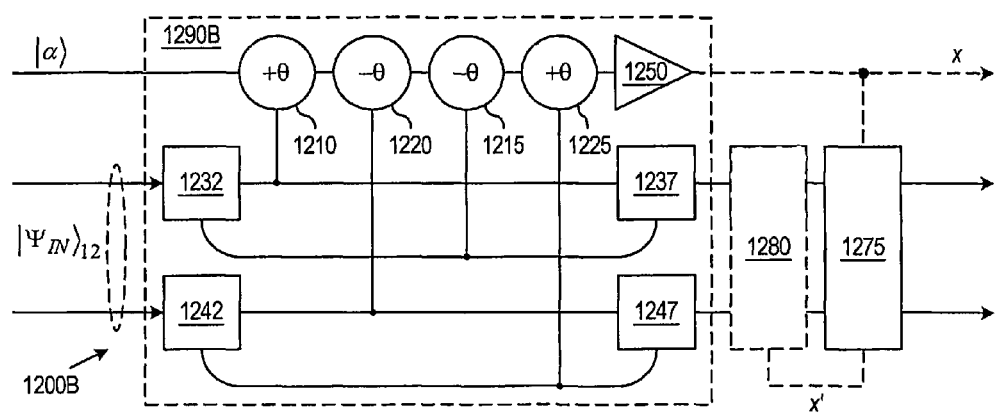

Other embodiments of parity detectors and/or entanglers can use properties other than polarization for separation of the components that control the phase shifters. FIG. 12B, for example, shows a parity detector 1290B and an entangler 1200B that are similar to parity detector 1290 and entangler 1200 of FIG. 12A but that use state separators 1232 and 1242 and state combiners 1237 and 1247 in place of polarizing beam splitters 1230, 1240, 1235, and 1245. The implementation of state separators 1232 and 1242 and state combiners 1237 and 1247 in general will depend on the distinguishing property of the components. For example, holograms can separate and recombine angular momentum components of input states, so that individual angular momentum components control the controlled phase shifters. Optical switches with appropriate timing control can similarly act as component separators and combiners in an embodiment using time bin encoding. With such changes, a homodyne measurement in parity detector 1290B projects an input state $|\Psi_{IN}\rangle_{12}$ to a two-dimensional subspace defined by the separated components and identified by the measurement result x.

FIG. 12B also illustrates how entangler 1200B can perform feed forward state correction after recombination the separated components. In particular, entangler 1200B has a feed-forward correction system 1275 that is positioned after state combiners 1237 and 1247 and replaces the classically control phase shifter 1260 and bit flip 1270 of entangler 1200. In one embodiment of entangler 1200B, correction system 1275 contains optical elements corresponding to phase shifter 1260 and bit flip 1270 and performs the functions described above under control of the measurement signal x. This may require re-splitting the components of the one or more of the modes/qubits, but may be advantageous in allowing all conditional phase shifts and bit flips to be carried out together. For example, entangler 1200B may be employed with other quantum gates or systems 1280 that also require feed forward state correction. In such systems, correction system 1275 can receive multiple measurement signals x and x' from parity detector 1290B and other quantum systems 1280 and simultaneously perform the net correction required for systems 1200B and 1280.

Figure 12C:
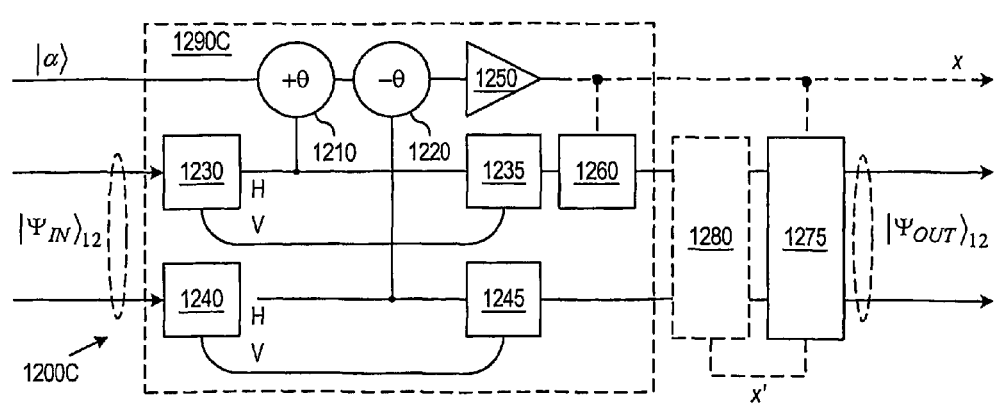

FIG. 12C shows an entangler 1200C in accordance with an embodiment of the invention requiring fewer controlled phase shifters. In particular, entangler 1200C includes a non-absorbing parity detector 1290C that uses only two phase shifters 1210 and 1220, rather than four as used in entangler 1200 or 1200B. In FIG. 12C, controlled phase shifter 1210 has a phase constant θ and acts on the probe state under the control of one component of a first mode/qubit of input photonic state $|\Psi_{IN}\rangle_{12}$. Controlled phase shifter 1220 has a phase constant −θ, which is the negative of the phase constant θ of controlled phase shifter 1210 and acts on the probe state under the control of a matching component of a second mode/qubit of input photonic state $|\Psi_{IN}\rangle_{12}$. Accordingly, matching components, e.g., the horizontally polarized components, of input qubits respectively control the action of controlled phase shifters 1210 and 1220 on the probe state $|\alpha\rangle$, but other configurations are possible. With the illustrated configuration, state |HH⟩ causes no net phase shift in the probe state since controlled phase shifters 1210 and 1220 cause opposite phase shifts. State |VV⟩ causes no phase shift, and states |HV⟩ and |VH⟩ cause opposite non-zero phase shifts in the probe state. Accordingly, the operation of parity detector 1290C and entangler 1200C of FIG. 12C are substantially the same as that of parity detector 1290 or 1290C and entangler 1200 or 1200B, except for the magnitude of the phase shift.

Figure 13:
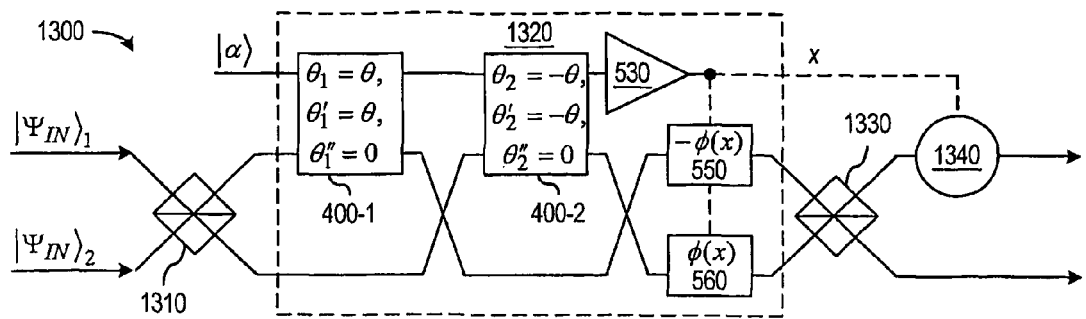
FIG. 13 shows an entangler in accordance with an embodiment using feed forward from a symmetry analyzer such as illustrated in FIG. 6A or 6B.

FIG. 13 shows an entangler 1300 in accordance with yet another embodiment of the invention. Entangler 1300 includes an input polarizing beam splitter 1310, a subspace projector 1320, an output polarizing beam splitter (or combiner) 1330, and a classically controlled bit flip system 1340.

Polarizing beam splitter (PBS) 1310 receives input qubits represented in a polarization basis by states $|\Psi_{IN}\rangle_{1}$ and $|\Psi_{IN}\rangle_{2}$. In an exemplary embodiment, state $|\Psi_{IN}\rangle_{1}$ represents a qubit to be encoded as an entangled state, e.g., $|\Psi_{IN}\rangle_{1} = c_0|H_1\rangle + c_1|V_1\rangle$, and state $|\Psi_{IN}\rangle_{2}$ is a known state, e.g., $$|\Psi_{IN}\rangle_2 = \frac{1}{\sqrt{2}}|H_2\rangle + \frac{1}{\sqrt{2}}|V_2\rangle.$$

The action of PBS 1310 maintains the symmetric states |HH⟩ and |VV⟩ but outputs a state |HV,0⟩ or |0,HV⟩ having two photons in one mode and no photons in the other when state |HV⟩ or |VH⟩ are input. The output state from PBS 1310 in the exemplary embodiment of entangler 1300 can thus be of the form $$\frac{c_0}{\sqrt{2}}|H_1H_2\rangle + \frac{c_1}{\sqrt{2}}|V_1V_2\rangle + \frac{c_0}{\sqrt{2}}|H_1V_1, 0\rangle + \frac{c_1}{\sqrt{2}}|0, H_2V_2\rangle.$$

Subspace projector 1320 projects the output state of PBS 1310 onto either the subspace of including states with one photon in each mode or the subspace including states with two photons in one mode and no photons in the other mode. In particular, for the exemplary input states, subspace projector 1320 outputs a state $c_0|H_1H_2\rangle + c_1|V_1V_2\rangle$ or $c_0|H_1V_1, 0\rangle + c_1|0, H_2V_2\rangle$ depending on a measurement outcome x. A suitable subspace projector 1320 may, for example, have the same structure and operation as does subspace projector 500A or 500B described above, but any system that provides a measurement indicating whether the output state of PBS 1310 is symmetric or not could alternatively be used.

Output PBS 1330 converts the states |HV,0⟩ and |0,HV⟩, which have two photons in one mode, back to states |HV⟩ or |VH⟩ having one photon in each mode. As a result, the output state from PBS 330 in the exemplary embodiment of the invention is either state $c_0|H_1H_2\rangle + c_1|V_1V_2\rangle$ or $c_0|H_1V_2\rangle + c_1|V_1H_2\rangle$. Accordingly, for one measurement outcome, PBS 330 outputs the desired entangled state $c_0|H_1H_2\rangle + c_1|V_1V_2\rangle$, and no state correction is required. For the other measurement outcome, PBS 330 outputs state $c_0|H_1V_2\rangle + c_1|V_1H_2\rangle$, and bit flip 1340 under control of measurement signal x transforms the output state to the desired form $c_0|H_1H_2\rangle + c_1|V_1V_2\rangle$. (The bit flip corresponds to a swap of horizontal and vertical polarizations and can be accomplished with a Pockels cell.)

Figure 14A:
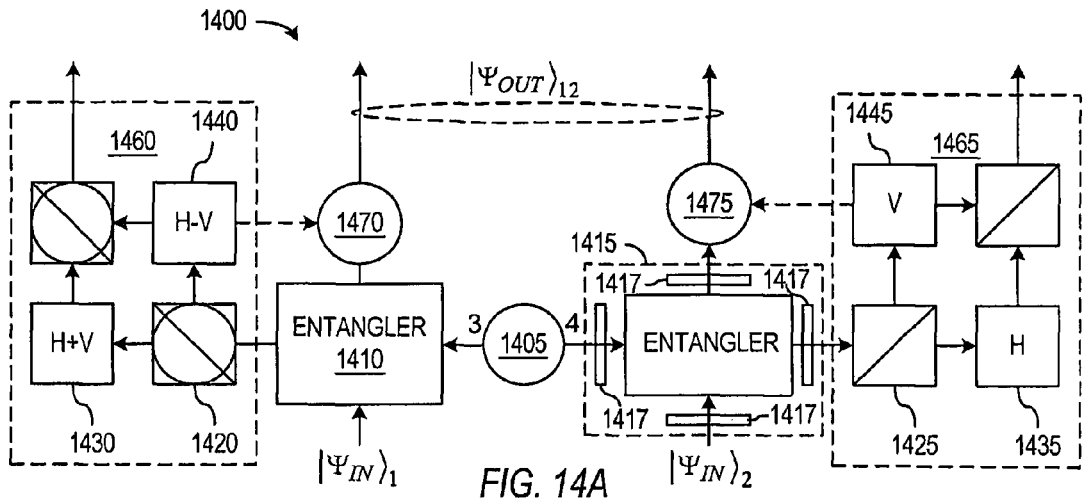
FIGS. 14A and 14B show alternative embodiments of CNOT gates employing entanglers and feed forward techniques in accordance with an embodiment of the invention.

Entanglers 1200, 1200B, 1200C, and 1300 are near deterministic as described above and can be employed in efficient non-absorbing CNOT gates. FIG. 14A illustrates one example of a non-absorbing CNOT gate 1400 in accordance with an embodiment of the invention. CNOT gate 1400 includes an entangler 1410 and a 45° entangler 1415. Entangler 1410 can be identical to any of the entanglers described above. The 45° entangler 1415 entangles states corresponding to polarization that are at a 45° angle to the basis states. The 45° entangler 1415 may be constructed by adding optical elements 1417, e.g., quarter-wave plates, that rotate the polarization vectors of input and output beams by 45°. Alternatively, 45° entangler 1415 can be identical to entangler 1200, 1200B, or 1200C after replacement of PBSs 1230, 1235, 1240, and 1245 with 45° polarizing beam splitters.

CNOT gate 1400 also includes a source 1405 of a maximally entangled state $$\frac{1}{\sqrt{2}}(|H_3H_4\rangle + |V_3V_4\rangle).$$

Source 1405 can be any system capable of producing entangled photon pairs, including but not limited to a system using parametric down conversion, non-linear optical fibers, or an entangler as described above to produce the desired entangled state.

With an initial state of the form given in Equation 30, the action of entangler 1410 evolves the input state as shown Equation 31 to maximally entangle mode 1 photons of input state $|\Psi_{IN}\rangle_{1}$ with the mode 3 photons from source 1405. A detector 1460 measures whether the mode 3 state is in a polarization state $$|S_3\rangle = \frac{1}{\sqrt{2}}[|H_3\rangle + |V_3\rangle] \text{ or } |F_3\rangle = \frac{1}{\sqrt{2}}[|H_3\rangle - |V_3\rangle].$$

In an exemplary embodiment of the invention, detector 1460 is a non-absorbing detector 1460 including a 45°-PBS 1420 that splits the mode 3 state into polarization components respectively proportional to states $|S_3\rangle$ and $|F_3\rangle$ and uses non-absorbing detectors 1430 to detect photons having the respective polarizations. Use of non-absorbing detectors is not required, but allows reconstruction and output of a photonic state for use elsewhere.

$$|\Psi_{IN}\rangle_1 \otimes \frac{1}{\sqrt{2}}(|H_3H_4\rangle + |V_3V_4\rangle) \otimes |\Psi_{IN}\rangle_2 = \quad \text{Equation 30}$$

$$[c_0|H_1\rangle + c_1|V_1\rangle] \otimes$$
$$\frac{1}{\sqrt{2}}(|H_3H_4\rangle + |V_3V_4\rangle) \otimes [d_0|H_2\rangle + d_1|V_2\rangle]$$

$$|\Psi_{IN}\rangle_1 \otimes \frac{1}{\sqrt{2}}(|HH\rangle + |VV\rangle) \otimes |\Psi_{IN}\rangle_2 \rightarrow \quad \text{Equation 31}$$

$$\frac{1}{\sqrt{2}}[c_0|H_1H_3H_4\rangle + c_1|V_1V_3V_4\rangle] \otimes [d_0|H_2\rangle + d_1|V_2\rangle]$$

The conditioned state after the measurement of detector 1460 is of the form indicated in Equation 32, where the plus sign is obtained when measurement outcome identifies state $|S_3\rangle$ and the minus sign results when the measurement outcome identifies state $|F_3\rangle$. A simple feed-forward system can perform a sign flip 1470 when the measurement from detector 1460 identifies state $|F_3\rangle$ so that the operation of the left hand side produces the state of Equation 33 regardless of the measurement outcome from detector 1460.

$$\rightarrow \frac{1}{\sqrt{2}}[c_0|H_1H_4\rangle \pm c_1|V_1V_4\rangle] \otimes [d_0|H_2\rangle + d_1|V_2\rangle] \quad \text{Equation 32}$$

$$|\Psi_{OUT}\rangle_1 \otimes |4\rangle \otimes |\Psi_{IN}\rangle_2 \rightarrow \quad \text{Equation 33}$$
$$\frac{1}{\sqrt{2}}[c_0|H_1H_4\rangle + c_1|V_1V_4\rangle] \otimes [d_0|H_2\rangle + d_1|V_2\rangle]$$

The 45'-entangler 1415 entangles the mode 4 photonic state from source 1405 and mode 2 input state $|\Psi_{IN}\rangle_2$ to transform the total state to the form indicated in Equation 34. A detector 1465 measures the polarization state of photons in mode 4. In an exemplary embodiment, detector 1465 is a non-absorbing detector including a PBS 1425 that splits the mode 4 photonic state and non-absorbing detectors 1435 and 1445 that measure the separated components of the mode 4 photon. More generally, detectors 1435 and 1445 are not required to be non-absorbing, but use of non-absorbing detectors 1435 and 1445 allows the recombination of the components to form an output state that is available for other uses. A bit flip 1475 swapping horizontal and vertical polarizations is performed if detector 1465 detects in vertically polarized photon the mode 4. The final state from these interactions and feed forward operations is given in Equation 35, which is the correct result for a CNOT operation on input states $|\Psi_{IN}\rangle_1$ and $|\Psi_{IN}\rangle_2$ using polarization encoding to represent qubits.

$$|\Psi_{OUT}\rangle_1 \otimes |\Psi_{IN}\rangle_2 \rightarrow \quad \text{Equation 34}$$
$$\frac{1}{\sqrt{2}}\begin{bmatrix} [c_0|H_1\rangle - c_1|V_1\rangle](d_0 - d_1)|F_4F_2\rangle + \\ [c_0|H_1\rangle + c_1|V_1\rangle](d_0 + d_1)|S_4S_2\rangle \end{bmatrix}$$

$$|\Psi_{OUT}\rangle_{12} \rightarrow \frac{1}{2}\begin{bmatrix} c_0d_0|H_1H_2\rangle + c_0d_1|H_1V_2\rangle + \\ c_1d_0|V_1V_2\rangle + c_1d_1|V_1H_2\rangle \end{bmatrix} \quad \text{Equation 35}$$

Equation 35 shows that gate 1400 has performed CNOT operation. Further, since the CNOT operation is substantially independent of the measurement outcomes in entanglers 1410 and 1415, the operation is a near deterministic and correctly succeeds with a high efficiency. From a different perceptive, entanglers 1410 and 1415 effectively act like polarizing beam-splitters that do not allow the photon bunching effects. Without these photon bunching effects simple feed-forward operations allows CNOT gate 1400 to be made near deterministic. This represents a huge saving in the physical resources to implement single photon quantum logic.

Figure 14B:
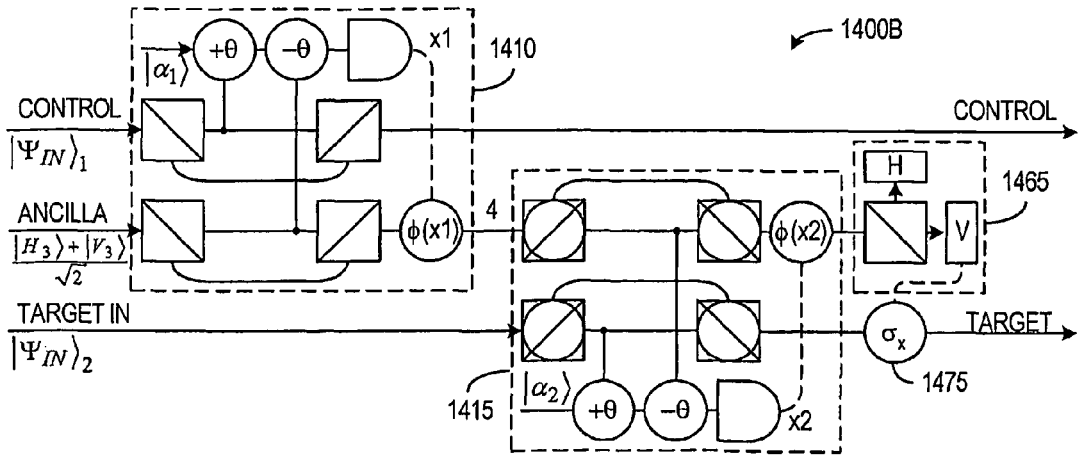

FIG. 14B shows another example of a near deterministic CNOT gate 1400B that uses three input photonic states rather than the four used in CNOT gate 1400 of FIG. 14A. The three input states to CNOT gate 1400B are states $|\Psi_{IN}\rangle_1$ and $|\Psi_{IN}\rangle_2$ representing the control and target qubits with polarization encoding and an ancillary "mode 3" state of the form $(|H_3\rangle + |V_3\rangle)/\sqrt{2}$. In this embodiment, the output mode from entangler 1410 to 45° entangler 1415 is referred to as mode 4. With this convention it can be shown the state resulting from operation of entangler 1410 on control state $|\Psi_{IN}\rangle_1$ and the mode 3 state is given by Equation 33 above. Further description of similar operation of an entangler in a CNOT gate can be found in T. B. Pittman, M. J. Fitch, B. C. Jacobs, and J. D. Franson, "Experimental Controlled-NOT Logic Gate For Single Photons In The Coincidence Basis," Phys. Rev. A 68, 032316 (2003). The operation and construction of 45° entangler 1415, detector 1465, and bit flip 1475 are described above in regard to CNOT gate 1400 of FIG. 14A. Accordingly, that description is not repeated here.

FIG. 14B further illustrates a specific implementation in which entangler 1410 is substantially identical to entangler 1200C of FIG. 12C, and 45° entangler 1415 is the same as entangler 1410 except for the replacement of polarizing beam splitters with 45° polarizing beam splitters. However, other embodiments of entanglers could alternatively be employed.

Non-absorbing detection can be also used to make existing probabilistic quantum gates into near deterministic quantum gates. An example of a known probabilistic CNOT gate, referred to herein as the KLM CNOT, is described by Knill et al, "A Scheme for Efficient Quantum Computation with Linear Optics," Nature 409, 47 (2001). FIG. 15 shows a near-deterministic CNOT gate 1500 that is based on the probabilistic KLM CNOT. Similarly to the KLM CNOT gate, CNOT gate 1500 includes input polarizing beam splitters 1510 and 1515, non-polarizing beam splitters 1520 and 1525, non-linear sign (NS) gates 1530 and 1535, non-polarizing beam splitters 1540 and 1545, and output polarizing beam splitters 1550 and 1555. However, in CNOT gate 1500, NS gates 1530 and 1535 can be made more efficient through use of non-absorbing detection as described further below.

During an exemplary CNOT operation, polarizing beam splitters 1510 and 1515 respectively receive control and target qubits that are polarization-encoded single-photon states. Each beam splitter 1510 or 1515 separates the polarization components of the corresponding input state to convert the corresponding qubit to a "which-path" encoding. A polarization rotator (not shown) may be added to one of the output modes of PBS 1525, so that both modes correspond to the same photon polarization. Beam splitter 1520 performs a Hadamard transformation on the target qubit, before beam splitter 1525 interferes components from the control and target qubits. Non-polarizing beam splitter 1525 can cause bunching of two photons into the same mode. In particular, a state that provides one photon to each input mode of beam splitter 1525 can produce a state in which two photons are both in the output mode headed to NS shift gate 1520 or the output mode headed to NS shift gate 1535. Ideally, each NS gate 1530 and 1535 transforms a state that is a linear combination of Fock states containing 0, 1, and 2 photons as shown in Equation 36, so that each NS gate 1530 introduces a sign shift only to the 2-photon component state. Beam splitter 1540 undoes the bunching, so that the state of the output modes of beam splitter 1540 is the same as the state of the input modes beam splitter 1525 except for a sign change on the component having one photon in each output mode. As a result of this sign change, the which-path encoded qubit output from beam splitter 1545 is the required state for a CNOT operation. Polarizing beam splitters 1550 and 1560 can then convert the which-path qubits back to polarization-encoded qubits.

$$|\varphi\rangle = c_0|0\rangle + c_1|1\rangle + c_2|2\rangle \xrightarrow{NS} |\varphi'\rangle$$
$$= c_0|0\rangle + c_1|1\rangle - c_2|2\rangle$$

Equation 36

The known KLM CNOT gate is deterministic apart from the non-linear sign (NS) gates. Conventional probabilistic NS gates only succeed in performing the operation of Equation 36 for certain measurement outcome signatures, which may occur less than 25% of the time. Accordingly, a conventional KLM CNOT may only successfully perform the CNOT operation 1 out of 16 times. CNOT gate 1500 is augmented using NS gates 1530 and 1535 that use non-absorbing detection to improve efficiency NS gates 1530 and 1535 as described further below.

FIG. 16A shows an embodiment of a near-deterministic non-linear sign (NS) gate 1600. NS gate 1600 includes three non-polarizing beam splitters 1610, 1620, and 1630, two non-absorbing detectors 1640 and 1650, and cyclical quantum buffers 1660 and 1670 on the output and input sides of NS gate 1600. In operation, known Fock states $|0\rangle$ and $|1\rangle$ respectively containing 0 and 1 photon are applied to input modes of beam splitter 1610. An input state $|\phi\rangle$ of the form shown in Equation 36 and one of the output modes of beam splitter 1610 are applied to the input modes of beam splitter 1620, and one output mode from each of beam splitters 1610 and 1620 is applied to a corresponding input mode of beam splitter 1630. In generally, the timing of the input signals and the optical path lengths within NS gate are such that beam splitters 1610, 1620, and 1630 cause interference of the input photonic states.

Non-absorbing detectors 1640 and 1650 measure photon numbers on the output modes of beam splitter 1630 while preserving other properties of the photonic states. Non-absorbing detectors 1640 and 1650 output respective measurement signals X1 and X2 and the respective measured photonic states. In an exemplary embodiment, each non-absorbing detector 1640 or 1650 includes a polarization preserving phase gate that is under control of an output mode of beam splitter 1630 and a measurement system that measures a phase change in a probe state as described above. With appropriate selection of the respective transmissivities $T_1$, $T_2$, and $T_3$ and angles $\theta_1$, $\theta_2$, and $\theta_3$ characterizing non-polarizing beam splitters 1610, 1620, and 1630, the state of one output mode of beam splitter 1620 will be the state $|\phi'\rangle$ of Equation 36 if non-absorbing detector 1640 detects a single photon and non-absorbing detector 1650 detects none. For one embodiment of NS gate, angles $\theta_1$, $\theta_2$, and $\theta_3$ satisfy Equations 37. (See Knill et al, "A Scheme for Efficient Quantum Computation with Linear Optics," Nature 409, 47 (2001) and supplementary information on-line for a description of beam splitter properties that achieve this result.) However, if detectors 1640 and 1650 fail to respectively detect one and zero photons, the output state will fail to have the desired form of state $|\phi'\rangle$. For the conventional KLM CNOT corresponding to FIG. 16A, failure to produce the desired output state occurs about 75% of the time, making the conventional KLM CNOT gate inefficient.

$$T_1 = \cos^2\theta_1 = 1/(4-2\sqrt{2})$$
$$T_2 = \cos^2\theta_2 = (3-2\sqrt{2})$$
$$T_3 = \cos^2\theta_3 = T_1$$

Equations 37

NS gate 1600 uses non-absorbing detectors 1640 and 1650 that identify whether the output modes from beam splitter 1630 are in a state corresponding to a successful production of the desired state $|\phi'\rangle$ or in a state corresponding to a failure to produce the desired state $|\phi'\rangle$. For example, a measurement outcome X may indicate a successful gate operation if a measurement signal X1 from detector 1640 indicates one photon and a measurement signal X2 from detector 1650 indicates no photons. If the measurement outcome X indicates production of the desired state $|\phi=\rangle$, buffers 1660 transmit the desired state $|\phi'\rangle$, and NS gate 1600 has successfully performed the correct operation. If the measurement outcome X indicates a failure to produce the desired state, the measurement signal sets buffers 1660 to reflect the photonic states back through NS gate 1600, so that the photons effectively retrace their paths back to buffers 1670 on the input side of NS gate 1600. The return trip undoes changes and returns the photons to states $|\phi\rangle$, $|0\rangle$, and $|1\rangle$. Buffers 1670 are then reflective so that the states $|\phi\rangle$, $|0\rangle$, and $|1\rangle$ are returned for another attempt to produce the desired state $|\phi'\rangle$. In this manner, original photonic states can be routed back and forth through NS gate 1600, and the photonic states that failed to produce the desired state $|\phi'\rangle$ on a previous pass through NS gate 1600 can thus still provide a successful generation of the desired state $|\phi'\rangle$ in a subsequent pass. NS gate 1600 can thus provide a much greater efficiency or probability of success and can approach near-deterministic success with a sufficient number of passes.

FIG. 16B illustrates another NS gate 1600B that uses non-absorbing detectors to increase the probability of successful operation. In NS gate 1600B, states $|\phi\rangle$ and $|1\rangle$ are applied to the input modes of beam splitter 1610, and state $|0\rangle$ and one output mode of beam splitter 1610 are applied to the input modes of bean splitter 1620. Non-absorbing detectors 1640 and 1650 are respectively on one output mode of beam splitter 1620 and the available output mode of beam splitter 1610. With appropriate choice of the characterizing angles $\theta_1$ and $\theta_2$ of beam splitters 1610 and 1620, a measurement outcome for which non-absorbing detector 1650 detects a single photon and non-absorbing detector 1640 detects none indicates that the unmeasured output mode of beam splitter 1620 is in the desired state $|\phi'\rangle$. The probability for a successful generation of state $|\phi'\rangle$ on a first pass through NS gate 1600B is about 23%, which is the percentage success for a conventional probabilistic NS gate have a structure similar to NS gate 1600B. However, NS gate 1600B includes cyclic quantum buffers 1660 that reflect the output photons back into NS gate 1600B when the measurement outcome indicates a failure, and in conjunction with buffers 1670, buffers 1660 can repeatedly return the photons until the desired state ⟩ is generated.

Non-absorbing detectors can more generally be used to improve the efficiency of other probabilistic gates. FIG. 17 illustrates a general quantum gate 1700 that is based on a known probabilistic gate. Quantum gate 1700 includes input coherent quantum buffers 1710, a probabilistic gate 1720, and output coherent quantum buffers 1730. Probabilistic quantum gate 1720 includes an optical system 1722 (e.g., a linear optical system) and non-absorbing detectors 1724. Optical system 1722 can be identical to an optical system used in a known probabilistic quantum gate that uses detector measurements to induces non-linear interactions of photonic states, but in accordance with an aspect of the invention, probabilistic quantum gate 1720 uses non-absorbing detectors 1724 in place of conventional detectors that destroy the photonic state being measured. In operation, input and ancillary photonic states required for probabilistic gate 1720 are input through CQBs 1710, and non-absorbing detectors 1724 determine whether gate 1720 has succeeded in producing the correct output state. If so, the output state is transmitted through CQBs 1730. If not, the measurement signal from detectors 1724 switches CQBs 1710 and 1730 to their reflective states. The output photonic states and the ancillary photonic states then return through gate 1720 to CQBs 1710, which re-input the photonic states back to gate 1720 for another chance at producing the desired output. Each additional pass through gate 1720 provides another chance for a successful gate operation. Gate 1700 therefore has a higher probability of successful operation than does gate 1720 or the corresponding conventional probabilistic gate.

Although the invention has been described with reference to particular embodiments, the description only provides examples of the invention's application and should not be taken as a limitation. For example, although operation of specific embodiments of the invention may be described or illustrated with specific input states such as product states, the above embodiments can more generally operate on any suitable quantum states including entangled and mixed states. Various other adaptations and combinations of features of the embodiments disclosed are within the scope of the invention as defined by the following claims.

What is claimed is:

1. A quantum coherent system comprising:
a first controlled phase shifters having a first phase constant;
a second controlled phase shifter having a second phase constant that is the negative of the first phase constant;
a probe electromagnetic mode passing through the first controlled phase shifter and the second controlled phase shifter;
a detector positioned to measure a phase shift in the probe electromagnetic mode;
a first state separator having first and second output modes, wherein the first output mode of the first state separator controls the first controlled phase shifter; and
a second state separator having first and second output modes, wherein the first output mode of the second state separator controls the second controlled phase shifter.

2. The system of claim 1, wherein the first state separator comprises a first polarizing beam splitter, and the second state separator comprises a second polarizing beam splitter.

3. The system of claim 1, further comprising:
a third controlled phase shifter that has the second phase constant and is controlled by the second output mode of the first state separator; and
a fourth controlled phase shifter that has the first phase constant and is controlled by the second output mode of the second state separator.

4. The system of claim 1, further comprising:
a first state combiner positioned to recombine the first and second modes of the first state separator; and
a second state combiner positioned to recombine the first and second modes of the second state separator.

5. The system of claim 1, further comprising state corrective optics under control of a measurement signal from the detector.

6. The system of claim 1, wherein the system operates as an entangler.

7. The system of claim 6, wherein the entangler is employed in a CNOT gate.

8. The system of claim 1, wherein the system operates as a parity detector.

9. A parity detector comprising:
a first controlled phase shifters having a first phase constant;
a second controlled phase shifter having a second phase constant that is the negative of the first phase constant;
a probe electromagnetic mode passing through the first controlled phase shifter and the second controlled phase shifter;
a measurement system positioned to measure a phase shift in the probe electromagnetic mode;
a first polarizing beam splitter having first and second output modes, wherein the first output mode of the first polarizing beam splitter controls the first controlled phase shifter; and
a second polarizing beam splitter having first and second output modes, wherein the first output mode of the second polarizing beam splitter controls the second controlled phase shifter.

10. The parity detector of claim 9, further comprising:
a third controlled phase shifter that has the second phase constant and is controlled by the second output mode of the first polarizing beam splitter; and
a fourth controlled phase shifter that has the first phase constant and is controlled by the second output mode of the second polarizing beam splitter.

11. The parity detector of claim 9, further comprising state corrective optics under control of a signal from the measurement system.

12. The parity detector of claim 11, wherein the corrective optics alters a state of the output modes of the first polarizing beam splitter and the second polarizing beam splitter in response to the measurement system indicating the state had a first parity.

13. The parity detector of claim 9, wherein the measurement system projects a state of the output modes of the first polarizing beam splitter and the second polarizing beam splitter with high probability onto one of a first state and a second state, the first state having a first parity and the second state having a second parity that differs from the first parity.

14. The parity detector of claim 9, wherein the measurement system comprises a homodyne detector.

15. An entangler comprising the parity detector of claim 9 and further comprising a bit flip system that operates on a state of the output modes of one of the first polarizing beam splitter and the second polarizing beam splitter in response to a classical signal from the measurement system.

16. A CNOT gate comprising:
first entangling means for entangling a photonic state of a control mode of the CNOT gate with a photonic state of an ancillary mode, wherein the first entangling means entangles components of the photonic states corresponding to a first polarization basis;
second entangling means for entangling a photonic state of an output ancillary mode of the first entangling means with a photonic state of a target mode of the CNOT gate, wherein the second entangling means entangles components of the photonic states corresponding to a second polarization basis that differs from the first polarization basis;
means for measuring a polarization state of an output ancillary mode of the second entangling means; and
means for changing a polarization state of an output target mode of the second entangling means, wherein at least one of the first entangling means and the second entangling means comprises the entangler of claim 15.

* * * * *